United States Patent
Toshioka et al.

(10) Patent No.: US 7,464,542 B2
(45) Date of Patent: Dec. 16, 2008

(54) EXHAUST GAS PURIFICATION SYSTEM FOR INTERNAL COMBUSTION ENGINE

(75) Inventors: Shunsuke Toshioka, Toyota (JP);
Masaaki Kobayashi, Toyota (JP);
Hisashi Ohki, Toyota (JP); Masaaki Yamaguchi, Toyota (JP); Kotaro Hayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 165 days.

(21) Appl. No.: 11/502,521

(22) Filed: Aug. 11, 2006

(65) Prior Publication Data
US 2007/0000237 A1 Jan. 4, 2007

Related U.S. Application Data

(62) Division of application No. 10/843,290, filed on May 12, 2004, now Pat. No. 7,165,394.

(30) Foreign Application Priority Data
May 14, 2003 (JP) ............................. 2003-135921

(51) Int. Cl.
*F01N 3/00* (2006.01)
(52) U.S. Cl. ............................. 60/295; 60/285; 60/286; 60/292; 60/297; 60/301
(58) Field of Classification Search ................ 60/280, 60/285, 286, 287, 291, 292, 295, 297, 301, 60/303, 324
See application file for complete search history.

(56) References Cited

U.S. PATENT DOCUMENTS

| | | | |
|---|---|---|---|
| 5,850,735 A | 12/1998 | Araki et al. | |
| 6,233,925 B1 | 5/2001 | Hirota et al. | |
| 6,367,246 B1 | 4/2002 | Hirota et al. | |
| 6,568,178 B2 * | 5/2003 | Hirota et al. | ............... 60/297 |
| 6,901,750 B2 | 6/2005 | Toshioka et al. | |
| 6,907,862 B2 | 6/2005 | Kitahara | |
| 6,962,045 B2 * | 11/2005 | Kitahara et al. | ............... 60/295 |
| 7,246,485 B2 * | 7/2007 | Ohki et al. | ............... 60/285 |

FOREIGN PATENT DOCUMENTS

| | | |
|---|---|---|
| JP | A 6-727541 | 9/1994 |
| JP | A 9-53442 | 2/1997 |
| JP | A 11-107809 | 4/1999 |
| JP | A 2001-271634 | 10/2001 |
| JP | A 2002-38932 | 2/2002 |
| JP | A 2003-166415 | 6/2003 |
| WO | WO 03/033892 A1 | 4/2003 |

* cited by examiner

*Primary Examiner*—Binh Q. Tran
(74) *Attorney, Agent, or Firm*—Oliff & Berridge, PLC

(57) ABSTRACT

An exhaust gas purification system for an internal combustion engine can quickly recover the exhaust gas purification ability of an exhaust gas purification device by increasing opportunities to release the SOx occluded in the exhaust gas purification device. In the exhaust gas purification system having the exhaust gas purification device having the property of occluding the SOx in the exhaust gas emitted from the internal combustion engine and collecting particulate matter contained in the exhaust gas, when the load of the internal combustion engine falls within a load range in which SOx poisoning recovery control can be executed, during the time when the particulate matter is oxidized and removed by collection ability regeneration control (S105), the collection ability regeneration control is interrupted and the SOx poisoning recovery control is executed (S106, S107).

3 Claims, 12 Drawing Sheets

EXHAUST GAS PURIFICATION SYSTEM FOR INTERNAL COMBUSTION ENGINE

This is a Division of application Ser. No. 10/843,290 filed May 12, 2004, which claims the benefit of Japanese Application No. 2003-135921 filed May 14, 2003. The disclosure of the prior application is hereby incorporated by reference herein in its entirety.

BACKGROUND

Background of the Invention

1. Field of the Invention

The present invention relates to an exhaust gas purification system for cleaning or purifying the exhaust gas of an internal combustion engine.

2. Description of the Related Art

There has hitherto been disclosed a technique in which in order to clean or purify an exhaust gas emitted from an internal combustion engine, in particular a lean-burn one in which a lean air fuel mixture is burnt, particulate matter contained in the exhaust gas is collected by a filter, which carries thereon a catalyst having the function of oxidizing the substances contained in the exhaust gas, such as, for example, an NOx storage reduction catalyst (hereinafter simply referred to as "NOx catalyst"), and nitrogen oxides (NOx) in the exhaust gas are cleaned or purified at a high purification rate. However, the NOx catalyst has the property of occluding SOx in the exhaust gas in addition to NOx therein, and hence the exhaust gas cleaning or purifying function of the NOx catalyst deteriorates as the amount of the SOx occluded in the NOx catalyst increases.

Here, it is necessary to cause the SOx occluded in the NOx catalyst to be released from the NOx catalyst so as to recover the exhaust gas purification function of the NOx catalyst. In view of such a situation, there has been disclosed a technique in which the NOx occluded in an NOx catalyst is reduced and at the same time the SOx occluded in the NOx catalyst is released by controlling the air-fuel ratio of an exhaust gas flowing into the NOx catalyst to be a rich-side air-fuel ratio (for example, see a first patent document: Japanese patent application laid-open No. H9-53442). In this technique, however, the air-fuel ratio of the exhaust gas flowing into the NOx catalyst is controlled to be a rich-side air-fuel ratio regardless of the loaded condition of an associated internal combustion engine, so there is a fear that the temperature of the NOx catalyst might rise excessively or the HC in the exhaust gas might be released into the atmosphere in such cases as when the engine speed is high or when the engine torque is high.

In addition, in order to release the SOx occluded in the NOx catalyst, it is necessary to raise the temperature of the NOx catalyst to a relatively high temperature (e.g., 650° C.) and to control the air-fuel ratio of the exhaust gas flowing into the NOx catalyst to be a rich-side air-fuel ratio. Accordingly, there has also been disclosed a technique in which the particulate matter collected in the filter carried by the NOx catalyst is first oxidized for removal thereof, and it is then easily raised to a temperature necessary for the release of the SOx by making use of the heat generated at that time (for example, see second patent documents: Japanese patent Nos. 2727906 and 2001-271634, Japanese patent application laid-open Nos. H11-107809 and 2002-38932).

The exhaust gas purification ability of the exhaust gas purification device gradually deteriorates in accordance with the increasing amount of SOx in the exhaust gas being occluded in the exhaust gas purification device such as an NOx catalyst, etc., in the exhaust gas purification system. Accordingly, there is a need to cause the SOx occluded in the exhaust gas purification device to be released therefrom thereby to recover the exhaust gas purification ability of the exhaust gas purification device by controlling the temperature of the exhaust gas purification device and the air-fuel ratio of the exhaust gas flowing into the exhaust gas purification device.

To this end, however, it is necessary to raise the temperature of the exhaust gas purification device to a predetermined temperature, and to control the air-fuel ratio of the exhaust gas flowing into the exhaust gas purification device to be a predetermined rich-side air-fuel ratio, but there is a fear that it might be difficult to control the temperature of the exhaust gas purification device and the air-fuel ratio of the exhaust gas in this manner depending upon the loaded condition of the internal combustion engine. Furthermore, there is another fear that the HC in the exhaust gas might be released into the outside air due to the air-fuel ratio of the exhaust gas being controlled to the rich-side air-fuel ratio. Therefore, opportunities for the release of the SOx occluded in the exhaust gas purification device are limited depending upon the loaded condition of the internal combustion engine, thus making it difficult to quickly recover the exhaust gas purification ability of the exhaust gas purification device.

SUMMARY OF THE INVENTION

Accordingly, the present invention has been made in view of the problems as referred to above, and has for its object to provide an exhaust gas purification system for an internal combustion engine which has an exhaust gas purification device such as an NOx catalyst having the property of occluding SOx in the exhaust gas, and which is capable of increasing opportunities for the release of the occluded SOx thereby to quickly recover the exhaust gas purification ability of the exhaust gas purification device.

The present invention has focused attention on the loaded condition of the internal combustion engine when the oxidation of the particulate matter collected by the exhaust gas purification device is performed in an exhaust gas purification device of an exhaust gas purification system for an internal combustion engine. This is because a determination as to whether the release of the SOx occluded in the exhaust gas purification device is permitted is made depending upon the loaded condition of the internal combustion engine.

Thus, according to one aspect of the present invention, there is provided an exhaust gas purification system for an internal combustion engine, having an exhaust gas purification device having the property of occluding SOx in an exhaust gas emitted from the internal combustion engine and collecting particulate matter contained in the exhaust gas. The system comprises: a collection amount estimation device that estimates an amount of particulate matter collected in the exhaust gas purification device; a collection ability regeneration control device that controls the temperature of the exhaust gas purification device to be a first predetermined temperature when the amount of collected particulate matter estimated by the collection amount estimation device exceeds a predetermined amount of collection; an SOx poisoning recovery control device that controls the temperature of the exhaust gas purification device to be a second prescribed temperature, and at the same time controls the air-fuel ratio of the exhaust gas flowing into the exhaust gas purification device to be a predetermined rich-side air-fuel ratio when the SOx occluded in the exhaust gas purification device are released; an SOx release determination device that determines whether a load of the internal combustion engine falls within an SOx release load range in which the SOx occluded in the exhaust gas purification device can be released by the SOx poisoning recovery control device; and an SOx release device that interrupts the control of the collection ability regeneration control device and performs the control of the SOx poisoning recovery control device when the temperature of the exhaust gas purification device is controlled to be the first predetermined temperature by means of the collection ability regeneration control device, and when the SOx release determination device makes a determination that the load of the internal combustion engine falls within the SOx release load range.

In the exhaust gas purification system for an internal combustion engine as set forth above, the SOx contained in the exhaust gas is occluded by the exhaust gas purification device, and at the same time the particulate matter in the exhaust gas is also collected by the exhaust gas purification device, whereby the exhaust gas is cleaned or purified. The exhaust gas purification device may comprise a filter such as, for example, one carrying thereon an NOx storage reduction catalyst which serves to occlude the NOx and SOx in the exhaust gas.

Here, since the particulate matter collection ability of the exhaust gas purification device decreases in accordance with the increasing amount of the particulate matter collected therein, it is necessary to remove the collected particulate matter from the exhaust gas purification device thereby to recover the particulate matter collection ability thereof when the amount of the collected particulate matter reaches a predetermined amount. Thus, the amount of the particulate matter collected in the exhaust gas purification device is estimated by the collection amount estimation device. When the amount of the collected particulate matter thus estimated exceeds the predetermined amount of collection, which is defined as a threshold for making a determination that the particulate matter collection ability of the exhaust gas purification device should be recovered or regenerated, the control of regenerating the particulate matter collection ability of the exhaust gas purification device (hereinafter referred to as "collection ability regeneration control") is performed by the collection ability regeneration control device.

The collection ability regeneration control serves to oxidize and remove the particulate matter collected in the exhaust gas purification device by controlling the temperature of the exhaust gas purification device to be the first predetermined temperature. Accordingly, the first predetermined temperature is defined as the temperature of the exhaust gas purification device necessary to oxidize the particulate matter collected in the exhaust gas purification device.

In addition, the SOx contained in the exhaust gas is occluded in the exhaust gas purification device, but the exhaust gas purification ability of the exhaust gas purification device decreases in accordance with the increasing amount of SOx occlusion therein, so it is necessary to release the occluded SOx from the exhaust gas purification device. Accordingly, the control of making the temperature of the exhaust gas purification device to be the second predetermined temperature, and at the same time controlling the air-fuel ratio of the exhaust gas flowing into the exhaust gas purification device to be a predetermined rich-side air-fuel ratio (hereinafter referred to as "SOx poisoning recovery control") is carried out by the SOx poisoning recovery control device.

Here, note that the second predetermined temperature is a temperature of the exhaust gas purification device necessary to release the occluded SOx from the exhaust gas purification device, and it is generally higher than the first predetermined temperature, but may be substantially equal to the first predetermined temperature if the occluded SOx can be released at such a temperature. Also, the predetermined rich-side air-fuel ratio is an air-fuel ratio of the exhaust gas necessary to release the SOx occluded in the exhaust gas purification device, and the occluded SOx can be reduced and released from the exhaust gas purification device by controlling the air-fuel ratio of the exhaust gas to be the predetermined rich-side air-fuel ratio.

However, in order to release the occluded SOx from the exhaust gas purification device by the SOx poisoning recovery control, it is necessary to make the air-fuel ratio of the exhaust gas flowing into the exhaust gas purification device to be the predetermined rich-side air-fuel ratio. Therefore, the SOx poisoning recovery control can be carried out only when the load of the internal combustion engine falls within a predetermined load range. That is, when the load of the internal combustion engine falls within a range where the engine torque is high or within a range where the rotational speed of the engine is high, the temperature of the exhaust gas purification device is raised excessively by an air-fuel ratio of the exhaust gas being made richer according to the SOx poisoning recovery control or the HC in the exhaust gas can be released to the outside air without being subjected to oxidation reactions in the exhaust gas purification device by the amount of the exhaust gas being increased. Therefore, it becomes possible to execute the SOx poisoning recovery control only when the load of the internal combustion engine falls within a range where the engine torque is relatively small and the rotational speed of the engine is relatively low.

Accordingly, by determining whether the load of the internal combustion engine falls within the SOx release load range where the engine torque is relatively small and the rotational speed of the engine is relatively low, the SOx release determination device determines whether the SOx poisoning recovery control is permitted or can be executed.

On the other hand, the collection ability regeneration control is the control of raising the temperature of the exhaust gas purification device to the first predetermined temperature, and there is no need to control the air-fuel ratio of the exhaust gas to be a rich-side air-fuel ratio, unlike the SOx poisoning recovery control. Therefore, the collection ability regeneration control is not greatly influenced by the load of the internal combustion engine unlike the SOx poisoning recovery control, but can be executed in a relatively wide engine load range. As a result, opportunities in which the collection ability regeneration control can be executed increase more than the opportunities in which the SOx poisoning recovery control can be executed.

Accordingly, in order to increase the opportunities to execute the SOx poisoning recovery control as much as possible, the SOx occluded in the exhaust gas purification device is released therefrom by the SOx release device. That is, when the SOx release determination device makes a determination that the load of the internal combustion engine falls within the SOx release load range, even during the execution of the collection ability regeneration control, the collection ability regeneration control is interrupted and the SOx poisoning recovery control is executed to release the occluded SOx without regard to the amount of the SOx occluded in the exhaust gas purification device by the SOx release device.

Thus, opportunities to release the occluded SOx increase as much as possible, so an increase in the amount of SOx occlusion in the exhaust gas purification device can be suppressed as much as possible. As a result, it is possible to more quickly recover the exhaust gas purification ability of the exhaust gas purification device. In addition, by interrupting the collection ability regeneration control and shifting to the SOx poisoning recovery control, the energy required to raise the temperature of the exhaust gas purification device is covered by the energy corresponding to an amount of energy obtained by shifting from the first predetermined temperature to the second predetermined temperature. Therefore, the energy required for the SOx poisoning recovery control itself can be suppressed to a low level.

Moreover, the loaded condition of the internal combustion engine varies during the time when the SOx poisoning recovery control is being executed by the SOx release device. Accordingly, when the control of the SOx release device is performed, and when the SOx release determination device makes a determination that the load of the internal combustion engine does not fall within the SOx release load range, the control of the SOx poisoning recovery control device may be stopped, and the control of the collection ability regeneration control device may be restarted.

That is, when the load of the internal combustion engine has changed into a state in which the engine load does not fall within the SOx release load range suitable for the release of SOx, even during the time when the SOx poisoning recovery control is being executed by the SOx release device, the SOx poisoning recovery control is stopped and the collection ability regeneration control, being in an interrupted state, is restarted so as to avoid an excessive temperature rise of the exhaust gas purification device and the release of HC to the outside air as referred to above. Accordingly, even when the opportunities are increased in which the SOx poisoning recovery control can be executed by the SOx release device, it is possible to prevent detrimental effects such as an excessive temperature rise of the exhaust gas purification device resulting from an excessive increase of such opportunities.

Further, the exhaust gas purification device may be of a construction other than the above-mentioned one in which the catalyst having the property of occluding the SOx in the exhaust gas is carried on the filter which serves to collect the particulate matter contained in the exhaust gas, e.g., a filter having an NOx catalyst carried thereon as referred to above. That is, the exhaust gas purification device may be constructed such that a catalyst having the property of occluding the SOx in the exhaust gas and a filter for collecting the particulate matter contained in the exhaust gas are arranged separately from each other. Specifically, the exhaust gas purification device comprises an SOx catalyst such as an NOx catalyst for occluding the SOx in the exhaust gas emitted from the internal combustion engine, and a filter disposed at a location downstream of the SOx catalyst for collecting the particulate matter contained in the exhaust gas.

In the exhaust gas purification system as constructed in such a manner, the collection amount estimation device estimates an amount of the particulate matter collected in the filter. The collection ability regeneration control device controls the temperature of the filter to be the first predetermined temperature when the amount of collected particulate matter estimated by the collection amount estimation device exceeds the predetermined amount of collection. The SOx poisoning recovery control device controls the temperature of the SOx catalyst to be the second predetermined temperature, and at the same time controls the air-fuel ratio of the exhaust gas flowing into the SOx catalyst to be a predetermined rich-side air-fuel ratio when the SOx occluded in the SOx catalyst is released. The SOx release determination device can determine whether the load of the internal combustion engine falls within the SOx release load range in which the SOx occluded in the SOx catalyst can be released by the SOx poisoning recovery control device.

With such an arrangement, opportunities to release the occluded SOx increase as much as possible, thereby making it possible to suppress the amount of occlusion of the SOx as low as possible. As a result, the exhaust gas purification ability of the exhaust gas purification device can be recovered more quickly.

Here, when the SOx poisoning recovery control according to the SOx release device is executed, the temperature of the exhaust gas purification device can reach the second predetermined temperature. Thus, if the second predetermined temperature is a temperature higher than or equal to the first predetermined temperature, the particulate matter collected in the exhaust gas purification device is oxidized during the SOx poisoning recovery control, too. As a result, the temperature of the exhaust gas purification device rises excessively, giving rise to a fear that the exhaust gas purification device might be subjected to erosion or dissolved loss.

Accordingly, in the exhaust gas purification system for an internal combustion engine as set forth above, the SOx release device may interrupt the control of the collection ability regeneration control device and perform the control of the SOx poisoning recovery control device when the temperature of the exhaust gas purification device is controlled to be the first predetermined temperature by means of the collection ability regeneration control device and the SOx release determination device makes a determination that the load of the internal combustion engine falls within the SOx release load range, and when the amount of collected particulate matter estimated by the collection amount estimation device decreases less than an excessive oxidation preventive collection amount that is less than the predetermined amount of collection. Here, the excessive oxidation preventive collection amount is defined as a threshold for the amount of collection of the particulate matter to determine that the temperature of the exhaust gas purification device is raised excessively due to the oxidization of the particulate matter collected at the time of the SOx poisoning recovery control according to the SOx release device.

That is, to prevent an excessive temperature rise of the exhaust gas purification device in the SOx poisoning recovery control according to the SOx release device, the SOx poisoning recovery control according to the SOx release device is not executed as long as the amount of the particulate matter collected in the exhaust gas purification device does not decrease below the excessive oxidation preventive collection amount, even when the load of the internal combustion engine falls within the SOx release load range during the collection ability regeneration control. As a result, in the SOx poisoning recovery control according to the SOx release device, it is possible to avoid the excessive temperature rise of the exhaust gas purification device.

Here, in the SOx poisoning recovery control according to the SOx release device, the occluded SOx is released from the exhaust gas purification device by supplying a reducing agent in the form of HC to the exhaust gas purification device through the exhaust gas. However, the released SOx further react with the HC in the exhaust gas so that they are thereby reduced to generate hydrogen sulfide. Accordingly, there will be fear that as the amount of the hydrogen sulfide thus generated increases, its offensive smell might become prominent.

Accordingly, in the exhaust gas purification system for an internal combustion engine as set forth above, a hydrogen sulfide release amount estimation device may be further provided for estimating an amount of the hydrogen sulfide released from the exhaust gas purification device when the control of the SOx release device is performed. The SOx release device may interrupt the control of the collection ability regeneration control device and perform the control of the SOx poisoning recovery control device for a period of time from the time when the temperature of the exhaust gas purification device is controlled to be the first predetermined temperature by means of the collection ability regeneration control device and the SOx release determination device makes the determination that the load of the internal combustion engine falls within the SOx release load range, until the time when the amount of the hydrogen sulfide released from the exhaust gas purification device, which is estimated by the hydrogen sulfide release amount estimation device, is less than a predetermined amount of release of hydrogen sulfide.

When the SOx poisoning recovery control according to the SOx release device is carried out, the released SOx is further reduced to hydrogen sulfide by the HC in the exhaust gas, but it takes a time until the amount of the generated or released hydrogen sulfide increases to the predetermined amount of release of hydrogen sulfide at which the offensive smell thereof becomes prominent. Accordingly, by performing the SOx poisoning recovery control according to the SOx release device only for such a limited period of time, it is possible to prevent the offensive smell due to the hydrogen sulfide from becoming prominent.

Therefore, it is considered that the offensive smell of the hydrogen sulfide according to the SOx poisoning recovery control of the SOx release device does not become prominent in a period of time from the time when the SOx release determination device makes a determination that the load of the internal combustion engine falls within the SOx release load range, until the time when the amount of the released hydrogen sulfide, which is estimated by the hydrogen sulfide release amount estimation device, increases to the predetermined amount of release of hydrogen sulfide at which the offensive smell becomes prominent. Thus, the SOx poisoning recovery control is executed only for this period of time. Here, in view of the reduction reaction of the SOx, the hydrogen sulfide release amount estimation device estimates the amount of the released hydrogen sulfide by taking account of the exhaust gas temperature, the air-fuel ratio of the exhaust gas, the temperature of the exhaust gas purification device at the time of the SOx poisoning recovery control, the time elapsed from start of the SOx poisoning recovery control, etc. In addition, the amount of released hydrogen sulfide may be either of an accumulated amount of the released hydrogen sulfide from the time when the release of the hydrogen sulfide is started or an amount of release of hydrogen sulfide per unit time, and a predetermined amount of the released hydrogen sulfide corresponding to each of these amounts of released hydrogen sulfide is set.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of an exhaust gas purification system for an internal combustion engine according to the present invention will be described in detail while referring to the accompanying drawings.

First Embodiment

Figure 1:
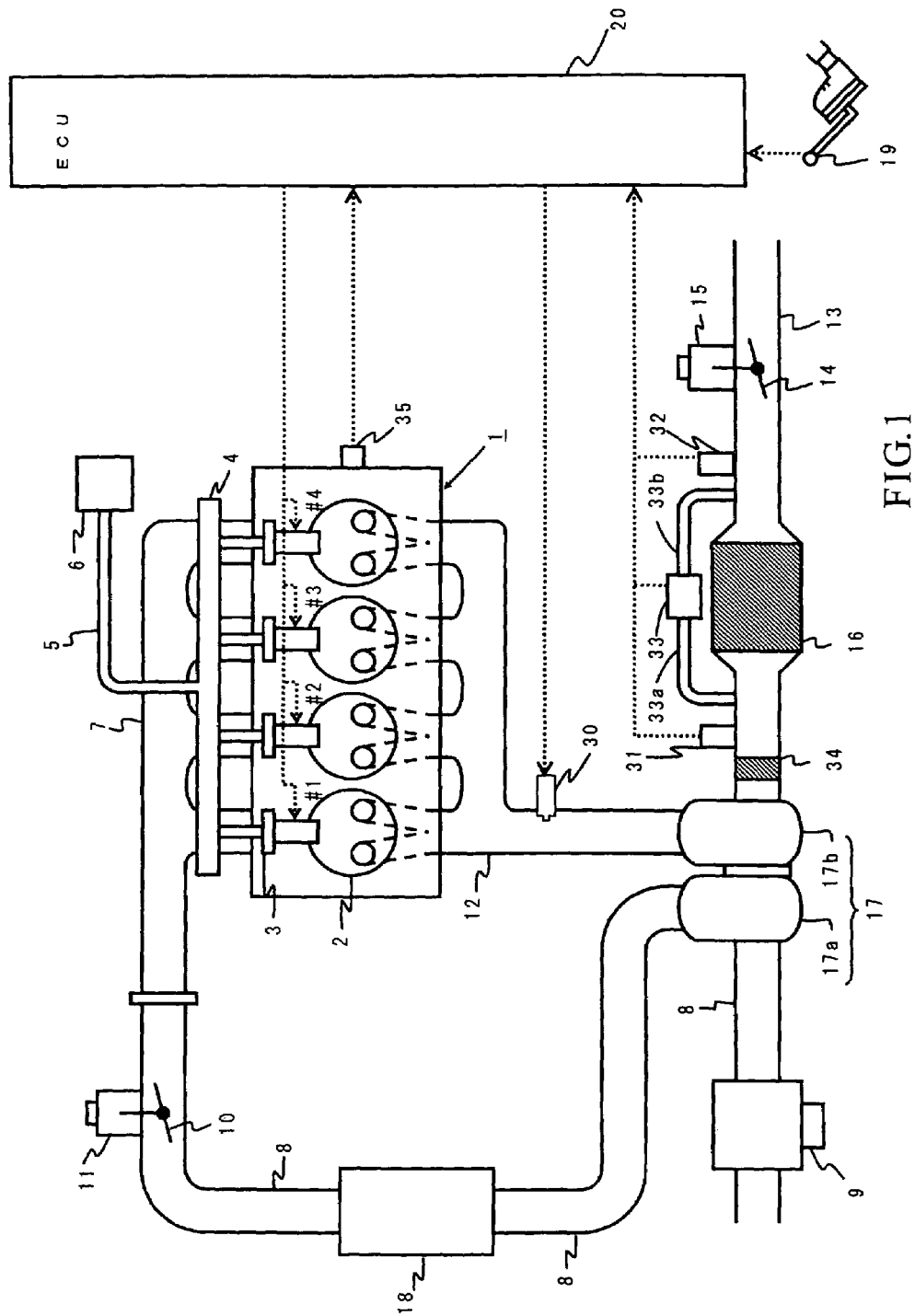
FIG. 1 is a block diagram showing the schematic construction of an internal combustion engine and its control system including an exhaust gas purification system according to the present invention.

FIG. 1 is a block diagram that illustrates the schematic construction of an internal combustion engine and its control system including an exhaust gas purification system to which the present invention is applied.

The internal combustion engine (hereinafter also referred to simply as an engine), generally designated at reference numeral 1, is an internal combustion engine having four cylinders 2. The engine 1 is provided with fuel injection valves 3, one for each cylinder 2, for directly injecting fuel into a combustion chamber of each cylinder 2. The respective fuel injection valves 3 are connected with an accumulator 4 that serves to accumulate or pressurize the fuel to a predetermined pressure. The accumulator 4 is in communication with a fuel pump 6 through a fuel supply pipe 5.

An intake manifold 7 is connected with the engine or engine proper 1 in such a manner that it is in communication with the combustion chambers of the respective cylinders 2 through intake ports (not illustrated), respectively. Here, communication between the combustion chamber of each cylinder 2 and its associated intake port is controlled by opening and closing of an associated intake valve (not illustrated). The intake manifold 7 is connected with an intake pipe 8, to which is attached an air flow meter 9 for generating an electric signal corresponding to the mass of intake air flowing through the intake pipe 8. A throttle valve 10 is disposed in the intake pipe 8 at a location immediately upstream of the intake manifold 7 for adjusting the flow rate of intake air flowing through the intake pipe 8. Attached to the throttle valve 10 is a throttle actuator 11 in the form of a step motor or the like for driving the throttle valve 10 to open and close.

Here, provision is made for a centrifugal supercharger (turbocharger) 17 which is adapted to be driven by a drive source in the form of the energy of the exhaust gas from the respective cylinders 2 to compress intake air supplied from the intake pipe 8 to the respective cylinders 2. The centrifugal supercharger 17 has a compressor housing 17a arranged on the intake pipe 8 at a location between the air flow meter 9 and the throttle valve 10, and an intercooler 18 for cooling the intake air which has been raised to a high temperature by compression thereof in the compressor housing 17a is installed on the intake pipe 8 at a location downstream of the compressor housing 17a.

On the other hand, an exhaust manifold 12 is connected with the engine or engine proper 1 with its branch conduits being in communication with the combustion chambers of the respective cylinders 2 through exhaust ports, respectively. Here, communication between the combustion chamber of each cylinder 2 and its associated exhaust port is controlled by opening and closing of an associated exhaust valve (not illustrated). In addition, a fuel addition valve 30 for adding fuel to the exhaust gas flowing in the exhaust manifold 12 is installed on the exhaust manifold 12.

The exhaust manifold 12 is connected with a turbine housing 17b of the centrifugal supercharger 17, which is in turn connected with one end of an exhaust pipe 13 which is connected at the other end thereof with a muffler (unillustrated). In addition, installed on the exhaust pipe 13 at a location downstream of the turbine housing 17b is an exhaust gas purification device 16 in the form of a filter with an NOx catalyst carried thereon, which serves to clean or purify the exhaust gas discharged from the internal combustion engine by occluding and reducing the NOx in the exhaust gas, and which also has the function of collecting particulate matter in the exhaust gas. This NOx catalyst has the property to occlude SOx in the exhaust gas, too, and functions as an SOx catalyst. Moreover, a precatalyst 34 having an oxidation function is disposed on the exhaust pipe 13 at a location upstream of the exhaust gas purification device 16.

Further, an exhaust throttle valve 14 is disposed on the exhaust pipe 13 at a location downstream of the exhaust gas purification device 16 for adjusting the flow rate of the exhaust gas passing through the exhaust pipe 13. Attached to the exhaust throttle valve 14 is a throttle actuator 15 in the form of a step motor or the like for driving the exhaust throttle valve 14 to open and close.

Here, the fuel injection valves 3 and the fuel addition valve 30 are operated to open and close by control signals from an electronic control unit (hereinafter referred to as ECU) 20. That is, the injection time and the injection quantity of fuel in the fuel injection valves 3 and the fuel addition valve 30 are controlled for each valve by means of commands from the ECU 20.

Furthermore, an accelerator opening sensor 19 is electrically connected to the ECU 20, so that the ECU 20 receives a signal from the sensor 19 representative of the degree of opening or depression of an accelerator pedal, and calculates, based thereupon, engine output power and the like as required of the internal combustion engine 1. Also, a crank position sensor 35 is electrically connected to the ECU 20, so that the ECU 20 receives a signal from the sensor 35 representative of the angle of rotation of an output shaft or crankshaft of the internal combustion engine 1, and calculates, based thereupon, the rotational speed of the internal combustion engine 1 and the like.

In addition, an exhaust gas temperature sensor 31 for detecting the temperature of the exhaust gas flowing into the exhaust gas purification device 16 is disposed on the exhaust pipe 13 at a location between the precatalyst 34 and the exhaust gas purification device 16. Also, an exhaust gas air-fuel ratio sensor 32 for detecting the air-fuel ratio of the exhaust gas flowing out of the exhaust gas purification device 16 into the exhaust pipe 13 is installed on the exhaust pipe 13 at a location downstream of the exhaust gas purification device 16. The exhaust gas temperature sensor 31 and the exhaust gas air-fuel ratio sensor 32 are electrically connected to the ECU 20, so that the exhaust gas temperature sensor 31 transmits a voltage corresponding to the temperature of the exhaust gas to the ECU 20, whereby the temperature of the exhaust gas is detected by the ECU 20. Also, the exhaust gas air-fuel ratio sensor 32 transmits a voltage corresponding to the concentration of oxygen in the exhaust gas to the ECU 20, whereby the air-fuel ratio of the exhaust gas is detected by the ECU 20.

Further, an upstream side introduction pipe 33a for introducing the exhaust gas into a differential pressure sensor 33 to be described later is connected at its one end with the exhaust pipe 13 at a location between the precatalyst 34 and the exhaust gas purification device 16 and at the other end thereof with the differential pressure sensor 33. Also, a downstream side introduction pipe 33b is connected at its one end with the exhaust pipe 13 at a location downstream of the exhaust gas purification device 16, and at the other end thereof with the differential pressure sensor 33. The differential pressure sensor 33 transmits a voltage corresponding to a differential pressure between the exhaust gases introduced thereinto from the upstream side introduction pipe 33a and the downstream side introduction pipe 33b to the ECU 20, so that the differential pressure can be detected by the ECU 20.

The cleaning or purification of the exhaust gas discharged from the internal combustion engine 1 is carried out by the exhaust gas purification system constructed of these sensors, the exhaust gas purification device 16, the fuel addition valve 30 and the like. Accordingly, though the particulate matter contained in the exhaust gas is collected in the exhaust gas purification device 16, it is necessary to remove the collected particulate matter so that the collection ability of the exhaust gas purification device 16 decreases in accordance with the increasing amount of the collected particulate matter. Here, note that the differential pressure detected by the differential pressure sensor 33 increases as the particulate matter collected in the exhaust gas purification device 16 increases. Thus, when the differential pressure becomes equal to or higher than a predetermined pressure, collection ability regeneration control is carried out to remove the particulate matter collected in the exhaust gas purification device 16.

In the collection ability regeneration control, fuel is added from the fuel addition valve 30 to the exhaust gas, so that the added fuel is oxidized by the precatalyst 34 to raise the temperature of the exhaust gas flowing into the exhaust gas purification device 16 located at the downstream side of the pre-catalyst 34, whereby the particulate matter collected in the exhaust gas purification device 16 is oxidized. Moreover, by adjusting the amount and/or injection timing of fuel injected by each of the fuel injection valves 3 to raise the temperature of the exhaust gas flowing into the exhaust gas purification device 16, it is also possible to oxidize the particulate matter collected in the exhaust gas purification device 16.

Further, since the SOx in the exhaust gas is occluded in the exhaust gas purification device 16, when the amount of SOx occlusion increases up to the predetermined amount of occlusion, the exhaust gas purification ability such as, for example, NOx purification ability of the exhaust gas purification device 16 deteriorates to a remarkable extent. Accordingly, at that time, the SOx poisoning recovery control of releasing the SOx occluded in the exhaust gas purification device 16 is carried out. The SOx poisoning recovery control operates to add fuel from the fuel addition valve 30 to the exhaust gas, whereby the temperature of the exhaust gas flowing into the exhaust gas purification device 16 is caused to rise and at the same time the air-fuel ratio of the exhaust gas is controlled to be a predetermined rich-side air-fuel ratio suitable for the release of the SOx occluded in the exhaust gas purification device 16.

Figure 2:
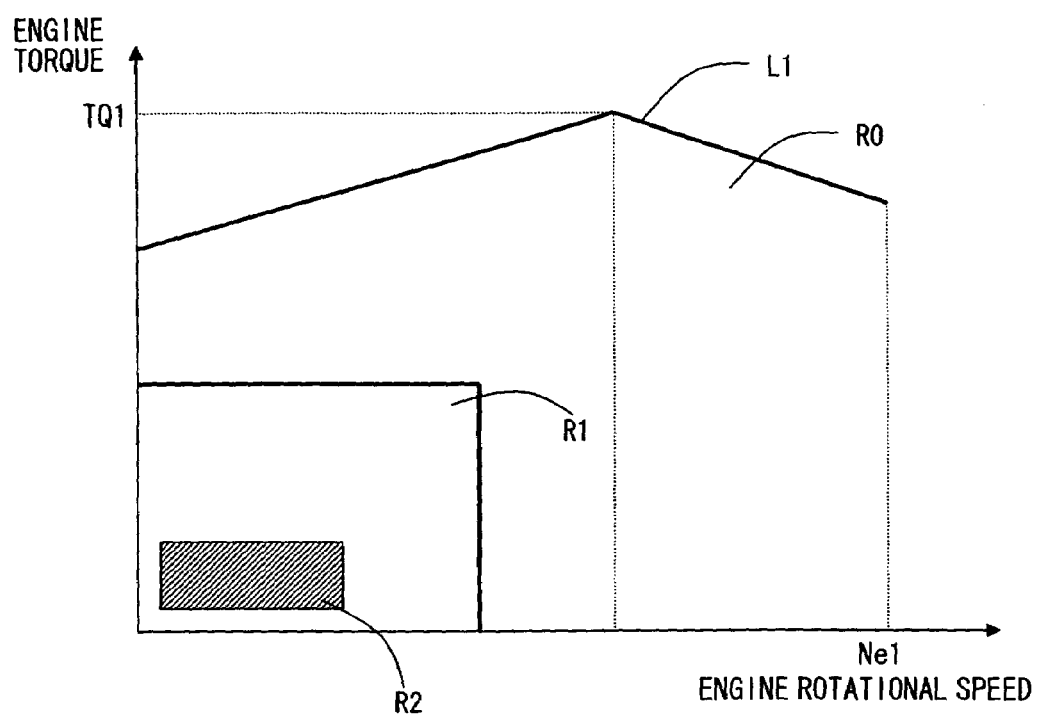
FIG. 2 is a schematic view showing the relation between the load of the internal combustion engine and a load range in which collection ability regeneration control and SOx poisoning recovery control can be executed according to an exhaust gas purification system according to the embodiment of the present invention.

In the SOx poisoning recovery control, however, it is necessary not only to raise the temperature of the exhaust gas flowing into the exhaust gas purification device 16 but also to control the air-fuel ratio of the exhaust gas to be the predetermined rich-side air-fuel ratio, and hence a first load range of the internal combustion engine in which SOx poisoning recovery control is permitted is greatly limited as compared with a second load range of the internal combustion engine in which collection ability regeneration control is permitted, as shown in FIG. 2.

Here, reference will be made to the relation between the first engine load range in which SOx poisoning recovery control is permitted and the second engine load range in which collection ability regeneration control is permitted, while referring to FIG. 2. FIG. 2 is a schematic view that shows these engine load ranges of the internal combustion engine 1, wherein the axis of abscissa represents the rotational speed of the internal combustion engine 1, and the axis of ordinate represents the engine torque of the internal combustion engine 1. Here, line L1 represents the change of the engine torque which can resist against the respective rotational speeds of the internal combustion engine 1, and the internal combustion engine 1 in this embodiment has the highest rotational engine speed Ne1 and the greatest or maximum engine torque TQ1. Therefore, the internal combustion engine 1 can resist with respect to the engine load that falls within an area R0 enclosed by the line L1, the axis of ordinate and the axis of abscissa.

In the internal combustion engine 1 having such an engine load characteristic, the collection ability regeneration control in the exhaust gas purification device 16 becomes executable when the load of the internal combustion engine 1 (hereinafter also referred to simply as "engine load") falls within the area R1 (hereinafter referred to as "collection ability regeneration load range R1"), whereas the SOx poisoning recovery control in the exhaust gas purification device 16 becomes executable when the load of the internal combustion engine 1 falls within an area R2 (hereinafter referred to as "SOx release load range R2"). As stated above, the relation between them is such that the SOx release load range R2 is greatly limited in comparison with the collection ability regeneration load range R1.

Figure 3:
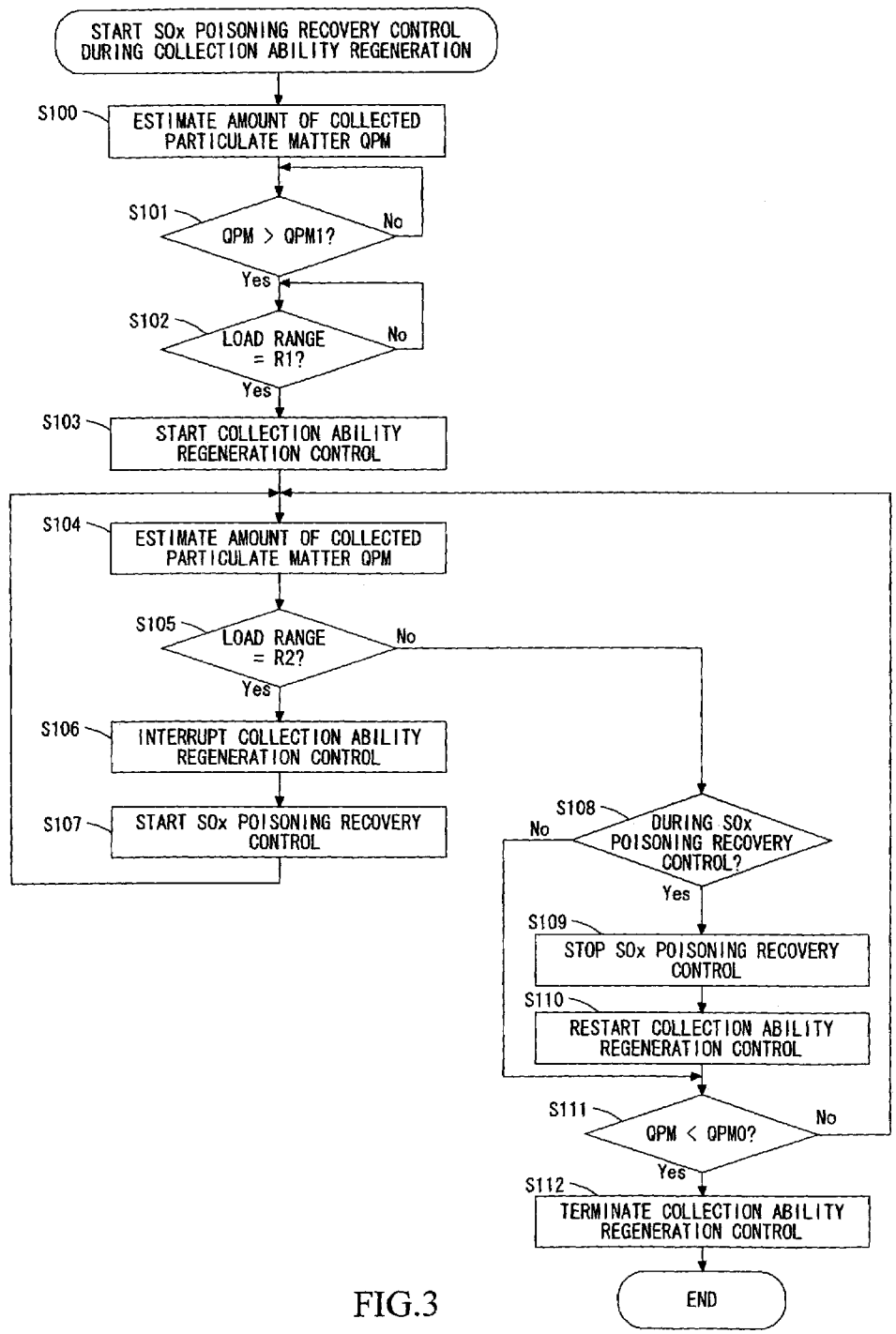
FIG. 3 is a flow chart showing the SOx poisoning recovery control at the time of execution of the collection ability regeneration control in the exhaust gas purification system according to the first embodiment of the present invention.

Accordingly, even if the SOx occluded in the exhaust gas purification device 16 is to be released therefrom after the amount of the occluded SOx has reached a predetermined amount, it becomes difficult to quickly release the occluded SOx to a satisfactory extent since opportunities to perform the SOx poisoning recovery control are limited as stated above. Thus, reference will be made to the control of ensuring more opportunities to perform the SOx poisoning recovery control in the exhaust gas purification device 16 while referring to FIG. 3. FIG. 3 is a flow chart showing SOx poisoning recovery control at the time when collection ability regeneration control is executed (hereinafter referred to as "SOx poisoning recovery control during collection ability regeneration"). Here, note that such control is executed by the ECU 20.

First of all, in step S100, the amount of collection QPM of the particulate matter collected in the exhaust gas purification device 16 is estimated. Specifically, this estimation is made based on a pressure differential between the pressures of the exhaust gas at an upstream side and at a downstream side of the exhaust gas purification device 16 detected by the differential pressure sensor 33, as stated before. When the process in step S100 has been completed, the control flow proceeds to step S110.

In step S101, it is determined whether the amount of collection QPM estimated in step S100 is more than a predetermined amount of collection QPM1. The predetermined amount of collection QPM1 is a threshold for the amount of the particulate matter collected in the exhaust gas purification device 16 above which collection ability regeneration control should be started. Therefore, when it is determined in step S101 that the amount of collection QPM is more than the predetermined amount of collection QPM1, the control flow advances to step S102 so as to perform the following collection ability regeneration control, whereas when it is determined in step S101 that the amount of collection QPM is less than or equal to the predetermined amount of collection QPM1, this means that the particulate matter collection ability of the exhaust gas purification device 16 still remains enough, and hence the processes in steps S100 and S101 are carried out again.

In step S102, it is determined whether the load of the internal combustion engine 1 falls within the collection ability regeneration load range R1. When QPM>QPM1 in step S101, a determination is made that collection ability regeneration control should be carried out, but in order to perform such control, it is necessary for the load of the internal combustion engine 1 to fall within a predetermined load range, as stated above. Accordingly, in step S102, if it is determined in step S102 that the load of the internal combustion engine 1 falls within the collection ability regeneration load range R1, that is, if the engine load is determined to be in a range in which collection ability regeneration control is permitted or can be executed, the control flow advances to step S103. On the other hand, if it is determined in step S102 that the load of the internal combustion engine 1 does not fall within the collection ability regeneration load range R1, that is, if the engine load is determined to be in a range in which collection ability regeneration control is not permitted or can not be executed, the process in step S102 is repeatedly carried out until the load of the internal combustion engine 1 falls within the collection ability regeneration load range R1.

In step S103, collection ability regeneration control is started so that the particulate matter collected in the exhaust gas purification device 16 is oxidized and removed.

Specifically, as stated above, such control is carried out by the addition of fuel to the exhaust gas by means of the fuel addition valve 30 or by the adjustment of the amount and/or injection timing of fuel injected by each of the fuel injection valves 3. With this control, the temperature of the exhaust gas purification device 16 can be raised to a first predetermined temperature, e.g., 600° C., whereby the particulate matter in the exhaust gas purification device 16 is oxidized. When the process in step S103 has been completed, the control flow goes to step S104.

In step S104, the amount of collection QPM of the particulate matter collected in the exhaust gas purification device 16 is estimated similarly to step S100. That is, the amount of the particulate matter, which has been oxidized and removed by the collection ability regeneration control started in step S103, is taken into consideration, and the amount of the particulate matter, which will be oxidized and removed in the following SOx poisoning recovery control executed in step S107 to be described later, is also taken into consideration. When the process in step S104 has been completed, the control flow goes to step S105.

In step S105, it is determined whether the load of the internal combustion engine 1 falls within the SOx release load range R2. In order to perform the SOx poisoning recovery control for the release of the SOx occluded in the exhaust gas purification device 16, it is necessary for the load of the internal combustion engine 1 to fall within a prescribed load range, as mentioned above. Accordingly, if it is determined in step S105 that the load of the internal combustion engine 1 falls within the SOx release load range R2, i.e., if the engine load is in a range in which the SOx poisoning recovery control is permitted or executable, the control flow advances to step S106, whereas if it is determined in step S105 that the load of the internal combustion engine 1 does not fall within the SOx release load range R2, i.e., if the engine load is not in a range in which the SOx poisoning recovery control is executable, the control flow advances to step S108.

Here, reference will be made to the processes in steps S106 and S107. In step S106, the collection ability regeneration control started in step S103 is interrupted. When the process in step S106 has been completed, the control flow proceeds to step S107.

In step S107, the SOx poisoning recovery control is started, so that the SOx occluded in the exhaust gas purification device 16 is released. Specifically, the temperature of the exhaust gas purification device 16 is raised to a second predetermined temperature, e.g., 650° C. by the addition of fuel to the exhaust gas by means of the fuel addition valve 30, as stated before, and at the same time the air-fuel ratio of the exhaust gas flowing into the exhaust gas purification device 16 is controlled to be a predetermined rich-side air-fuel ratio based on the detection value of the exhaust gas air-fuel ratio sensor 32, so that the release of the occluded SOx from the exhaust gas purification device 16 is carried out. Here, note that the second predetermined temperature may be substantially the same temperature as the first predetermined temperature that is the temperature of the exhaust gas purification device 16 set in step S1103, if it is a suitable temperature for the release of the occluded SOx.

Therefore, in step S107, if the load of the internal combustion engine 1 falls within the SOx release load range R2, the collection ability regeneration control, even if being executed, will be interrupted, and the SOx poisoning recovery control will be executed without regard to the amount of the SOx occluded in the exhaust gas purification device 16. When the process in step S107 has been completed, the processes from step S104 onward are carried out again.

Next, reference will be made to processes from step S108. In step S108, it is determined whether the SOx poisoning recovery control started in step S107 is being executed. That is, the advancement of the control flow to step S108 means that the load of the internal combustion engine 1 does not fall within the SOx release load range R2 in step S105. If the SOx poisoning recovery control is carried out in this case, there is fear that the temperature of the exhaust gas purification device 16 might rise excessively or HC might be released to the outside air, as described before, and hence it is determined whether the SOx poisoning recovery control should be stopped in the following processes. Accordingly, when it is determined in step S108 that the SOx poisoning recovery control is being executed, the control flow advances to step S109 where the SOx poisoning recovery control is stopped. After the process in step S109 has been completed, the control process advances to step S110 where the collection ability regeneration control, which has been interrupted in step S106, is restarted or resumed. When the process in step S110 has been completed, the control flow goes to step S111.

On the other hand, when it is determined in step S108 that the SOx poisoning recovery control is not being executed, i.e., when the collection ability regeneration control started in step S103 is being continuously executed, the control flow advances to step S111.

In step S111, it is determined whether the amount of particulate matter QPM estimated in step S104 is less than a predetermined amount of collection QPM0. The predetermined amount of collection QPM0 is a threshold for the amount of the particulate matter collected in the exhaust gas purification device 16 below which the collection ability regeneration control should be terminated. Therefore, when it is determined in step S111 that the amount of collection QPM is less than the predetermined amount of collection QPM0, the control flow advances to step S112 where the collection ability regeneration control started in step S103 or the collection ability regeneration control restarted in step S110 is terminated, and this control processing is ended. On the other hand, when it is determined in step S111 that the amount of collection QPM is more than or equal to the predetermined amount of collection QPM0, this means that the particulate matter collected in the exhaust gas purification device 16 is not oxidized and removed to a satisfactory extent, and hence the processes from step S104 onward are carried out again.

Figure 9:
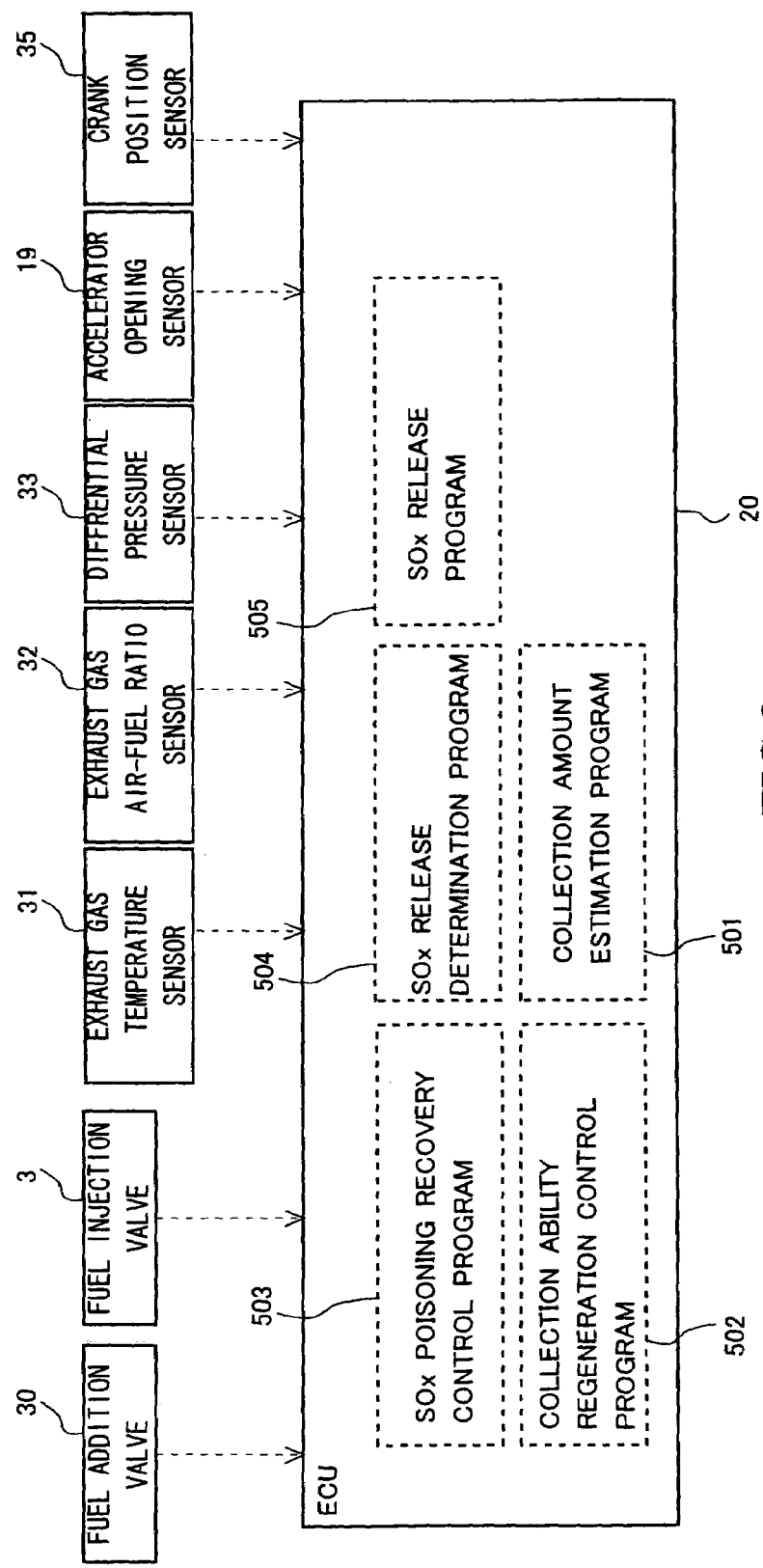
FIG. 9 is a control block diagram schematically showing the exhaust gas purification systems according to the first and second embodiments of the present invention.

Here, note that in this control, control programs shown in FIG. 9 are stored in the ECU 20. Specifically, a collection amount estimation program 501 (i.e., a control program for mainly performing the processes of steps S100 and S104) for estimating the amount of the particulate matter collected in the exhaust gas purification device 16 is stored in the ECU 20, and constitutes a collection amount estimation device together with the differential pressure sensor 33, etc. A collection ability regeneration control program 502 for performing the collection ability regeneration control is stored in the ECU 20, and constitutes a collection ability regeneration control device together with the fuel addition valve 30, the fuel injection valves 3, the exhaust gas temperature sensor 31, etc. An SOx poisoning control program 503 for performing the SOx poisoning recovery control is stored in the ECU 20, and constitutes an SOx poisoning recovery control device together with the fuel addition valve 30, the exhaust gas temperature sensor 31, the exhaust gas air-fuel ratio sensor 32, etc. An SOx release determination program 504 (i.e., a control program for mainly performing the process in step S105) for determining whether the load of the internal combustion engine 1 is in a state in which the SOx poisoning recovery control is permitted or can be performed is stored in the ECU 20, and constitutes an SOx release determination device together with the accelerator opening sensor 19, the crank position sensor 35, etc.

Further, an SOx release program 505 (i.e., a control program for mainly performing the processes in steps S106 and S107), which serves to interrupt the collection ability regeneration control being executed, and start SOx poisoning recovery control for the release of the occluded SOx when a prescribed condition holds, is stored in the ECU 20, and constitutes an SOx release device together with the fuel addition valve 30, the exhaust gas temperature sensor 31, the exhaust gas air-fuel ratio sensor 32, etc.

According to this control, when the load of the internal combustion engine 1 falls within the SOx release load range R2, the collection ability regeneration control, even if being executed, is interrupted and SOx poisoning recovery control is executed without regard to the amount of the SOx occluded in the exhaust gas purification device 16. As a result, opportunities to perform the SOx poisoning recovery control are increased, thus making it possible to more quickly recover the exhaust gas purification ability of the exhaust gas purification device 16.

In addition, even when the collection ability regeneration control is interrupted and the SOx poisoning recovery control is executed, if the load of the internal combustion engine 1 comes into a state in which it does no longer fall within the SOx release load range R2, the SOx poisoning recovery control is stopped and the collection ability regeneration control is restarted or resumed. As a consequence, it is possible to suppress an excessive rise in temperature of the exhaust gas purification device 16 and the release of HC to the outside air due to the SOx poisoning recovery control.

Here, note that in the SOx poisoning recovery control during the collection ability regeneration as mentioned above, the execution of the SOx poisoning recovery control depends upon whether the load of the internal combustion engine 1 falls within the SOx release load range R2, but if the SOx poisoning recovery control is executed even in such cases when the amount of SOx occlusion in the exhaust gas purification device 16 is so limited as to not influence the exhaust gas purification ability of the exhaust gas purification device 16, or when the amount of SOx occlusion is substantially zero, the air-fuel ratio of the exhaust gas is made to be a rich-side air-fuel ratio, thus giving rise to a fear that fuel economy might deteriorate.

Accordingly, in addition to the process in step S105 in the flow chart shown in FIG. 3, in which it is determined whether the load of the internal combustion engine 1 falls within the SOx release load range R2, the amount of the SOx occluded in the exhaust gas purification device 16 may be estimated, and when it is determined that the amount of SOx occlusion thus estimated is less than a predetermined amount of occlusion, the processes from step S108 onward may be carried out while skipping the processes in steps S106 and S107 even if the load of the internal combustion engine 1 falls within the SOx release load range R2. By so doing, it is possible to prevent deterioration in fuel economy due to the increased frequency (number of times) of SOx poisoning recovery control operations.

Figure 10:
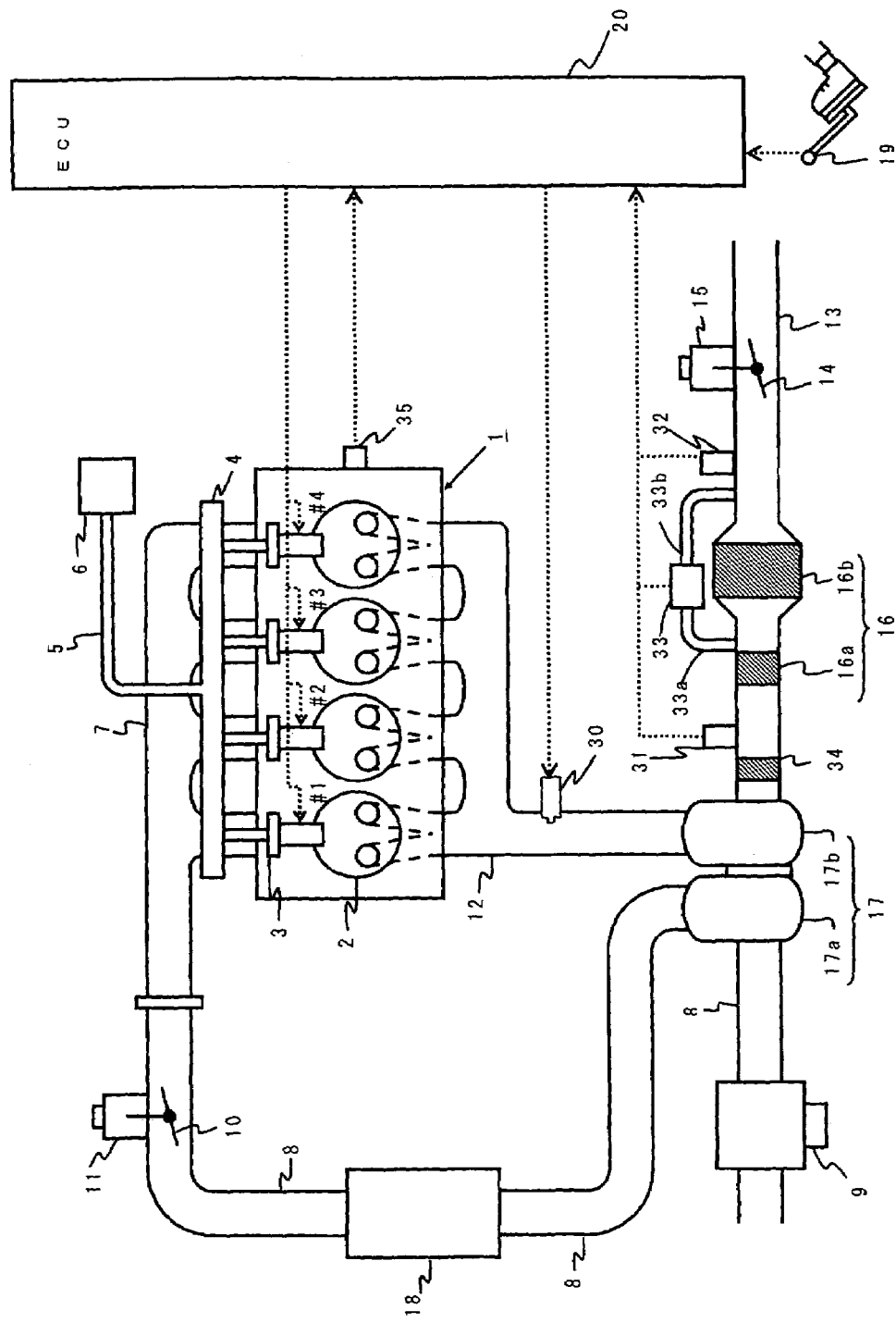
FIG. 10 is a block diagram showing an internal combustion engine and its control system including a modified form of exhaust gas purification system according to the embodiment of the present invention.

In addition, although in this embodiment, the exhaust gas purification device 16 is constructed such that the NOx catalyst having the property of occluding SOx in addition to NOx is carried on the filter capable of collecting particulate matter, the filter and the NOx catalyst may be arranged separately or independently from each other. That is, as shown in FIG. 10, the exhaust gas purification device 16 may comprise an SOx catalyst 16*a* in the form of an NOx catalyst having the property of occluding SOx in addition to NOx, and a filter 16*b* arranged at a downstream side of the SOx catalyst 16*a* and capable of collecting particulate matter.

In this case, the collection ability regeneration control serves to add fuel from the fuel addition valve 30 to the exhaust gas in the exhaust pipe 12, so that the added fuel is oxidized by the precatalyst 34 to raise the temperature of the exhaust gas flowing into the filter 16*b* located downstream of the precatalyst 34, whereby the particulate matter collected in the filter 16*b* is oxidized. Also, it is possible to oxidize the particulate matter collected in the filter 16*b* by adjusting the amount and/or injection timing of fuel being injected by each of the fuel injection valves 3 so as to raise the temperature of the exhaust gas flowing into the filter 16*b*.

Moreover, the SOx poisoning recovery control operates to add fuel from the fuel addition valve 30 to the exhaust gas, whereby the temperature of the exhaust gas flowing into the SOx catalyst 16*a* is caused to rise and at the same time the air-fuel ratio of the exhaust gas is controlled to be the predetermined rich-side air-fuel ratio suitable for the release of the occluded SOx. Here, note that the SOx poisoning recovery control is executed when the load of the internal combustion engine 1 falls within the SOx release load range R2, similarly as stated above.

Second Embodiment

Here, when the SOx poisoning recovery control according to the above-mentioned first embodiment is carried out, too, the temperature of the exhaust gas purification device 16 is raised to the second predetermined temperature, and the exhaust gas flowing into the exhaust gas purification device 16 is controlled to be a rich-side air-fuel ratio. At that time, a some amount of oxygen is made to remain in the exhaust gas, so that a part of the particulate matter collected in the exhaust gas purification device 16 is oxidized and removed therefrom. Therefore, if the amount of the particulate matter collected in the exhaust gas purification device 16 is excessively large, the temperature of the exhaust gas purification device 16 (or a filter in the case of the exhaust gas purification device 16 comprising an SOx catalyst in the form of an NOx catalyst and the filter which are arranged separately from each other, as shown in FIG. 10) will rise excessively by the heat of oxidation of the particulate matter, thus giving rise to a fear that the exhaust gas purification device 16 might be subjected to erosion or dissolved loss.

Figure 4:
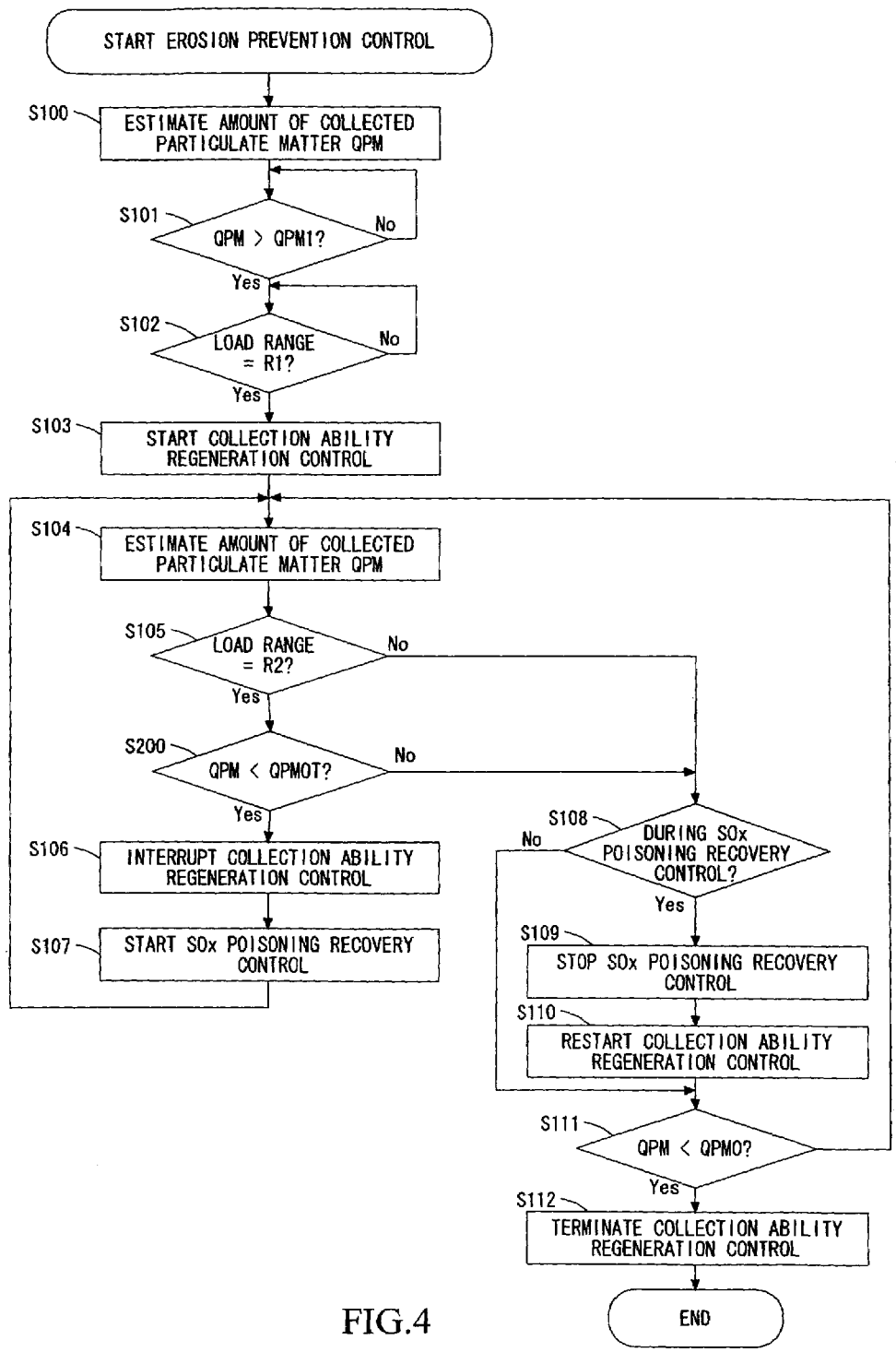
FIG. 4 is a flow chart showing SOx poisoning recovery control at the time of execution of collection ability regeneration control in an exhaust gas purification system according to a second embodiment of the present invention.

Accordingly, reference will be made to the control of avoiding erosion of the exhaust gas purification device 16 when the SOx poisoning recovery control according to the first embodiment is being carried out, while referring to FIG. 4. FIG. 4 is a flow chart showing the control of preventing the erosion of the exhaust gas purification device 16 at the time of SOx poisoning recovery control therein (hereinafter referred to as "erosion prevention control"). Such control is executed by the ECU 20. Here, note that in the flow chart of the erosion prevention control shown in FIG. 4, the same processes as those in the flow chart of the SOx poisoning recovery control during the collection ability regeneration as shown in FIG. 3 are identified by the same symbols as those employed in FIG. 3, while omitting an explanation thereof.

In the flow chart of the erosion prevention control of FIG. 4, if it is determined in step S105 that the load of the internal combustion engine 1 falls within the SOx release load range R2, the control flow advances to step S200 where it is determined whether the amount of particulate matter QPM estimated in step S104 is less than a predetermined amount of collection QPMOT. The predetermined amount of collection QPMOT is a threshold for the amount of the particulate matter collected in the exhaust gas purification device 16 above which it is determined that there is fear that the exhaust gas purification device 16 might erode due to the oxidation heat of the particulate matter collected in the exhaust gas purification device 16 at the time of the SOx poisoning recovery control.

Therefore, when it is determined in step S200 that the amount of collection QPM is less than the predetermined amount of collection QPMOT, this means that there is no fear of the erosion of the exhaust gas purification device 16 due to SOx poisoning recovery control. Accordingly, the SOx poisoning recovery control is carried out in the processes in step S106 and thereafter. On the other hand, if it is determined in step S200 that the amount of collection QPM is more than or equal to the predetermined amount of collection QPMOT, this means that there is a fear of the erosion of the exhaust gas purification device 16 due to the SOx poisoning recovery control. Thus, the control flow advances to step S108, and the SOx poisoning recovery control is not performed.

Here, reference will be made to the change in the amount of the particulate matter collected in the exhaust gas purification device 16 when the erosion prevention control according to this second embodiment is executed, while referring to a graph shown in FIG. 5. The axis of ordinate in the graph shown in FIG. 5 represents the amount of the particulate matter collected in the exhaust gas purification device 16, and the axis of abscissa represents the time elapsed.

Figure 5:
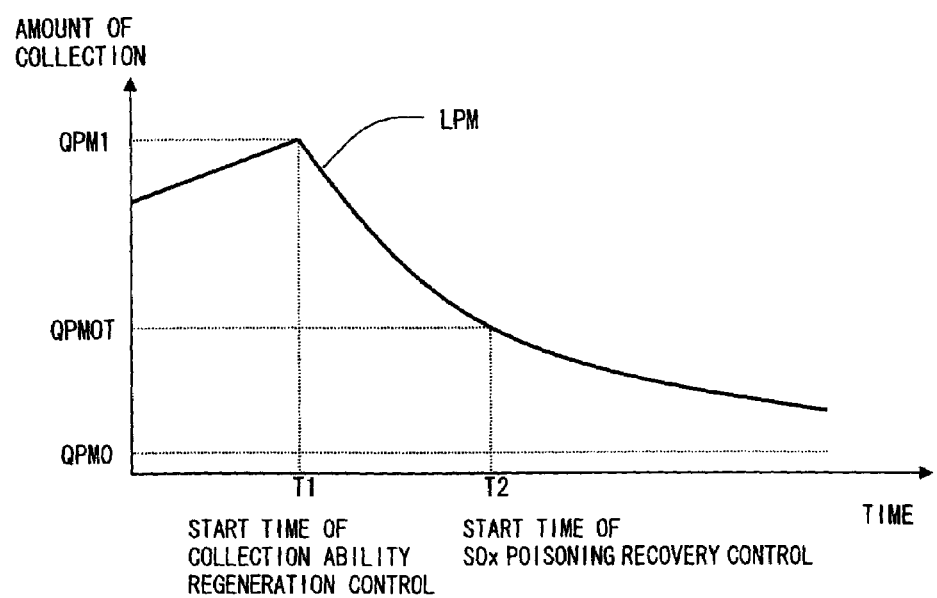
FIG. 5 is a graph showing a change in the amount of the particulate matter collected in an exhaust gas purification device when the SOx poisoning recovery control shown in FIG. 4 is executed.

In the graph shown in FIG. 5, a curve LPM represents the change in the amount of the particulate matter collected in the exhaust gas purification device 16. That is, until a point in time T1, particulate matter is successively collected in the exhaust gas purification device 16, so the amount of collection thereof increases, and when the amount of collection reaches QPM1 at time T1, collection ability regeneration control is executed if the load of the internal combustion engine 1 falls within the collection ability regeneration load range R1. That is, the processes in steps S100 through S103 in the erosion prevention control shown in FIG. 4 are carried out.

Then, the amount of collection is decreasing in accordance with the execution of the collection ability regeneration control, but if the amount of collection QPM is more than or equal to the predetermined amount of collection QPMOT, the SOx poisoning recovery control is not performed even when the load of the internal combustion engine 1 falls within the SOx release load range R2. Thereafter, at the time when the amount of collection QPM decreases below the predetermined amount of collection QPMOT, i.e., at a point in time T2 in the graph shown in FIG. 5, the SOx poisoning recovery control is performed. That is, the processes in step S200 and thereafter in the erosion prevention control shown in FIG. 4 are performed at time T2. Here, note that after time T2, the SOx poisoning recovery control or the collection ability regeneration control is executed depending upon the load of the internal combustion engine 1.

The above-mentioned control according this second embodiment is carried out by control programs which are stored in the ECU 20, as shown in FIG. 9, as in the case of the above-mentioned SOx poisoning recovery control during the collection ability regeneration. Specifically, the SOx release control according to the second embodiment is carried out by an SOx release program 505 (i.e., a control program for mainly performing the processes in steps S200, S106 and S107), which serves to interrupt the collection ability regeneration control being executed, and start SOx poisoning recovery control for the release of the occluded SOx when a prescribed condition holds. The SOx release program 505 constitutes an SOx release device together with the fuel addition valve 30, the exhaust gas temperature sensor 31, the exhaust gas air-fuel ratio sensor 32, etc.

According to the control of this second embodiment, opportunities to perform the SOx poisoning recovery control are increased as in the case of the above-mentioned first embodiment, so that the exhaust gas purification ability of the exhaust gas purification device 16 can be recovered more quickly, and at the same time the erosion of the exhaust gas purification device 16 can be prevented more reliably.

Third Embodiment

Here, the SOx released from the exhaust gas purification device 16 when the SOx poisoning recovery control according to the first embodiment is being performed are further reduced by the HC in the exhaust gas and changed into hydrogen sulfide. As the amount of the released hydrogen sulfide increases, there is fear that the offensive smell of the hydrogen sulfide in the ambient atmosphere might become prominent.

Figure 6:
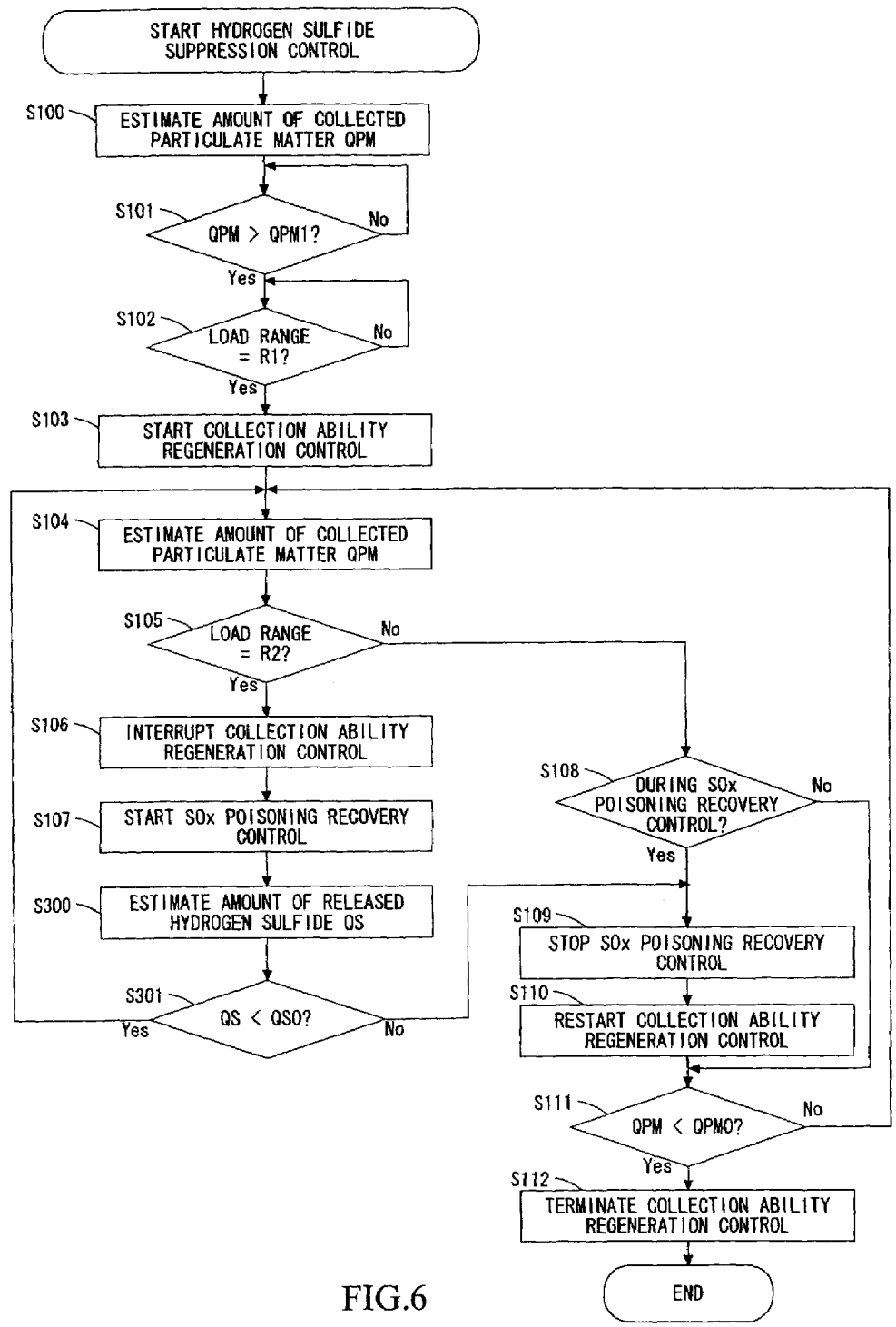
FIG. 6 is a flow chart showing SOx poisoning recovery control at the time of execution of collection ability regeneration control in an exhaust gas purification system according to a third embodiment of the present invention.

Accordingly, reference will be made to the control of avoiding the offensive smell due to the released hydrogen sulfide becoming prominent when the SOx poisoning recovery control according to the first embodiment is being carried out, while referring to FIG. 6. FIG. 6 is a flow chart showing the control of preventing or suppressing the offensive smell due to the hydrogen sulfide at the time of SOx poisoning recovery control in the exhaust gas purification device 16 (hereinafter referred to as "hydrogen sulfide suppression control"). The hydrogen sulfide suppression control is executed by the ECU 20. Here, note that in the flow chart of the hydrogen sulfide suppression control shown in FIG. 6, the same processes as those in the flow chart of the SOx poisoning recovery control during the collection ability regeneration as shown in FIG. 3 are identified by the same symbols as those employed in FIG. 3, while omitting an explanation thereof.

In the flow chart of the hydrogen sulfide suppression control of FIG. 6, when the process in step S107 has been completed, the control flow advances to step S300. In step S300, the amount of the hydrogen sulfide QS, which is resulted from the reduction of SOx released from the exhaust gas purification device 16 and emitted into the outside air, is estimated. In this embodiment, the amount of the hydrogen sulfide QS released in the outside air per unit time is estimated. Specifically, it is estimated from the temperature of the exhaust gas purification device 16 at the time of the SOx poisoning recovery control, the air-fuel ratio of the exhaust gas flowing into the exhaust gas purification device 16, the time elapsed after the SOx poisoning recovery control has been started, or the like. When the process in step S300 has been completed, the control flow proceeds to step S301.

In step S301, it is determined whether the amount of the released hydrogen sulfide QS estimated in step S300 is less than a predetermined amount of released hydrogen sulfide QS0. The predetermined amount of released hydrogen sulfide QS0 is a threshold for the amount of released hydrogen sulfide above which it is determined that the offensive smell due to the hydrogen sulfide is prominent. Therefore, when it is determined in step S301 that the estimated amount of released hydrogen sulfide QS is less than the predetermined amount of released hydrogen sulfide QS0, this means that the offensive smell due to the hydrogen sulfide is not prominent. Accordingly, the processes in step S104 and thereafter are performed so as to continue the SOx poisoning recovery control. On the other hand, when it is determined in step S301 that the estimated amount of released hydrogen sulfide QS is more than or equal to the predetermined amount of released hydrogen sulfide QS0, this means that the offensive smell due to the hydrogen sulfide is prominent. Thus, the processes in step S109 and thereafter are performed so as to stop the SOx poisoning recovery control thereby to suppress the generation of hydrogen sulfide.

Here, reference will be made to the changes in the amounts of release of SOx and hydrogen sulfide when the hydrogen sulfide suppression control according to this third embodiment is executed, while referring to a graph shown in FIG. 7. The axis of ordinate in the graph shown in FIG. 7 represents the amounts of release of SOx and hydrogen sulfide, and the axis of abscissa represents the time elapsed.

Figure 7:
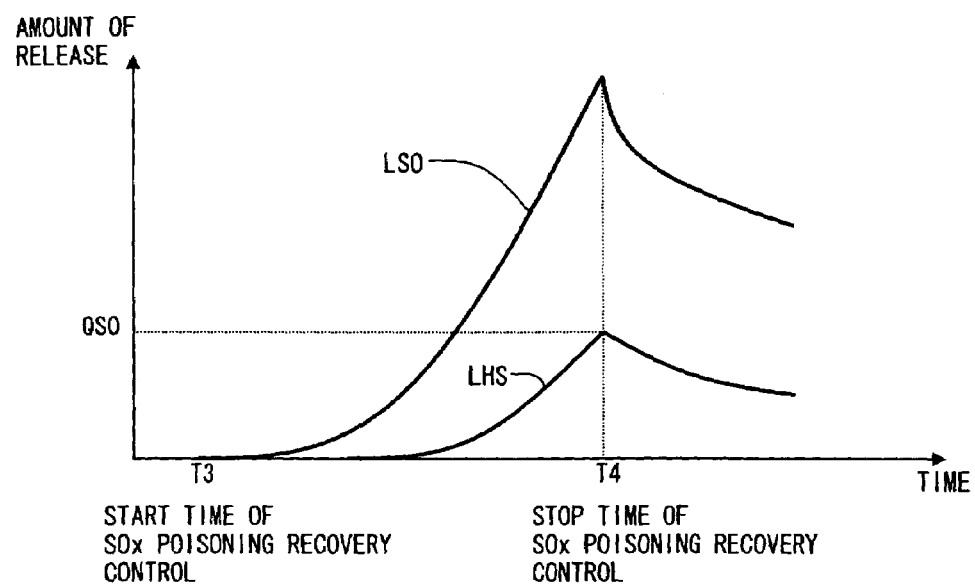
FIG. 7 is a graph showing a change in the amounts of SOx and hydrogen sulfide released from an exhaust gas purification device when the SOx poisoning recovery control shown in FIG. 6 is executed.

In the graph shown in FIG. 7, a curve LSO represents the change in the amount of the SOx released from the exhaust gas purification device 16, and a curve LHS represents the change in the amount of the released hydrogen sulfide due to the SOx released from the exhaust gas purification device 16. At time T3, the SOx poisoning recovery control begins to be executed, and the amount of the SOx released from the exhaust gas purification device 16 increases with time. In addition, the amount of release of the hydrogen sulfide also increases in accordance with the increasing amount of the released SOx, and the amount of release of the hydrogen sulfide reaches the predetermined amount of released hydrogen sulfide QS0 at time T4. Accordingly, the SOx poisoning recovery control is stopped at time T4, that is, the processes in steps S301 and S109 in the hydrogen sulfide suppression control shown in FIG. 6 are carried out. Here, note that when the load of the internal combustion engine 1 comes out of and no longer falls within the SOx release load range R2 in between time T3 and time T4, the SOx poisoning recovery control is stopped by the process of S105.

Figure 11:
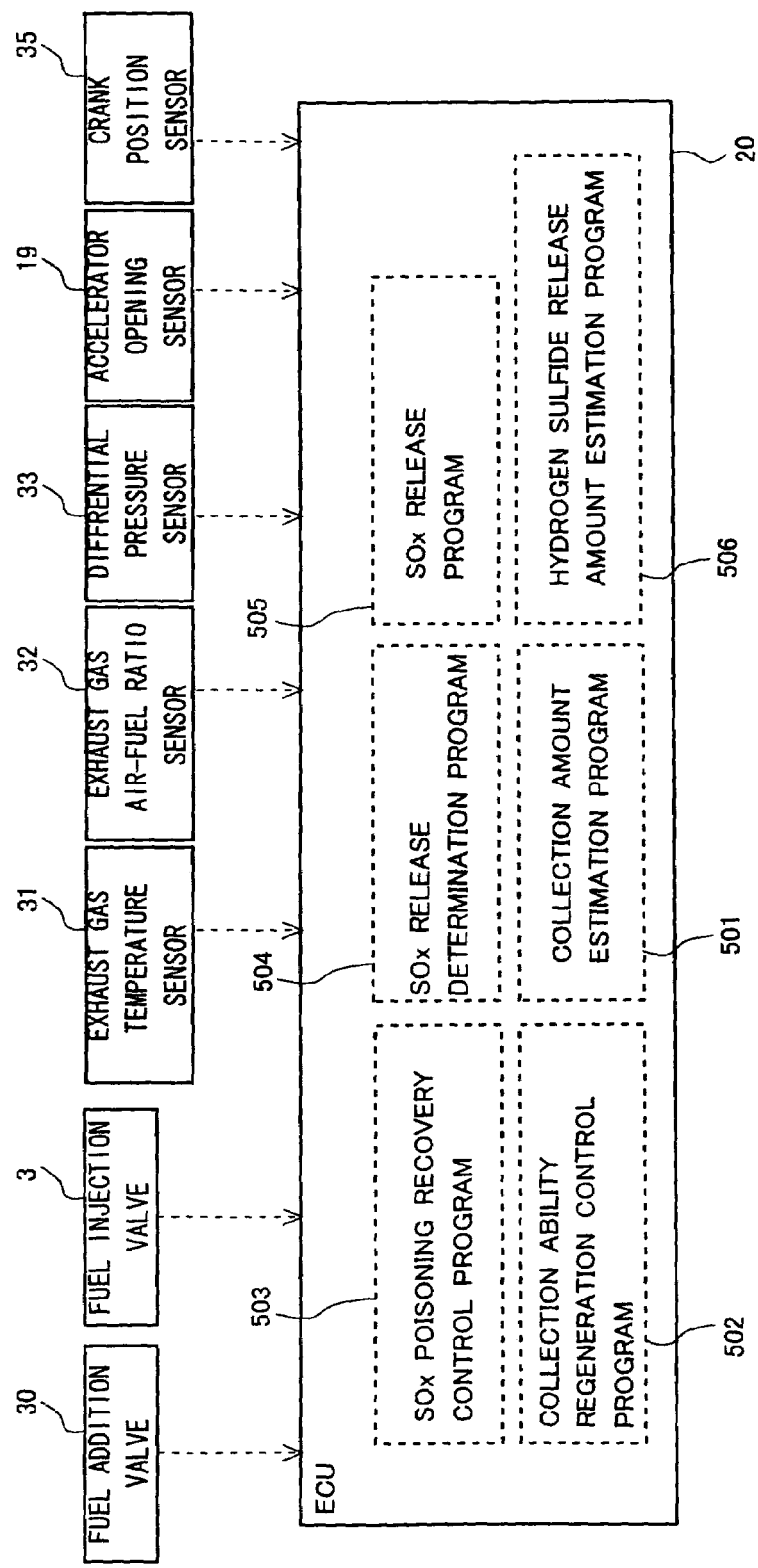
FIG. 11 is a control block diagram schematically showing the exhaust gas purification system according to the third embodiment of the present invention.

The above control according to this third embodiment is carried out by control programs which are stored in the ECU 20, as shown in FIG. 11. A collection amount estimation program 501, a collection ability regeneration control program 502, an SOx poisoning recovery control program 503, and an SOx release determination program 504 in FIG. 11 are similar to those in the above-mentioned SOx poisoning recovery control during collection ability regeneration shown in FIG. 9. In addition, a hydrogen sulfide release amount estimation program 506 (i.e., a control program for mainly performing the process in step S300 in this control) is stored in the ECU 20, and constitutes a hydrogen sulfide release amount estimation device together with the exhaust gas temperature sensor 31, the exhaust gas air-fuel ratio sensor 32, etc.

Moreover, the SOx release control according to the third embodiment is carried out by an SOx release program 505 (i.e., a control program for mainly performing the processes in steps S106, S107 and S301), which serves to interrupt the collection ability regeneration control being executed, and start SOx poisoning recovery control for the release of the occluded SOx when a prescribed condition holds. The SOx release program 505 constitutes an SOx release device together with the fuel addition valve 30, the exhaust gas temperature sensor 31, the exhaust gas air-fuel ratio sensor 32, etc.

According to the control of this third embodiment, opportunities to perform the SOx poisoning recovery control are increased as in the case of the above-mentioned first embodiment, so that the exhaust gas purification ability of the exhaust gas purification device 16 can be recovered more quickly, and at the same time the release of the hydrogen sulfide can be suppressed, thus making it possible to prevent the offensive smell due to the hydrogen sulfide from becoming prominent.

Fourth Embodiment

In the aforementioned SOx poisoning recovery control, to prevent an excessive temperature rise of the exhaust gas purification device 16, so-called rich spike control may be carried out in which the air-fuel ratio of the exhaust gas flowing into the exhaust gas purification device 16 is alternately controlled to be a rich-side air-fuel ratio and a lean-side air-fuel ratio. Here, as stated above, a part of the particulate matter collected in the exhaust gas purification device 16 is oxidized and removed even in the SOx poisoning recovery control, but in the rich spike control, the amount of oxygen in the exhaust gas increases when the air-fuel ratio of the exhaust gas flowing into the exhaust gas purification device 16 becomes a lean-side air-fuel ratio, so a greater amount of the particulate matter collected in the exhaust gas purification device 16 can be oxidized and removed in comparison with the case in which the air-fuel ratio of the exhaust gas is controlled to be a rich-side air-fuel ratio alone.

Figure 8:
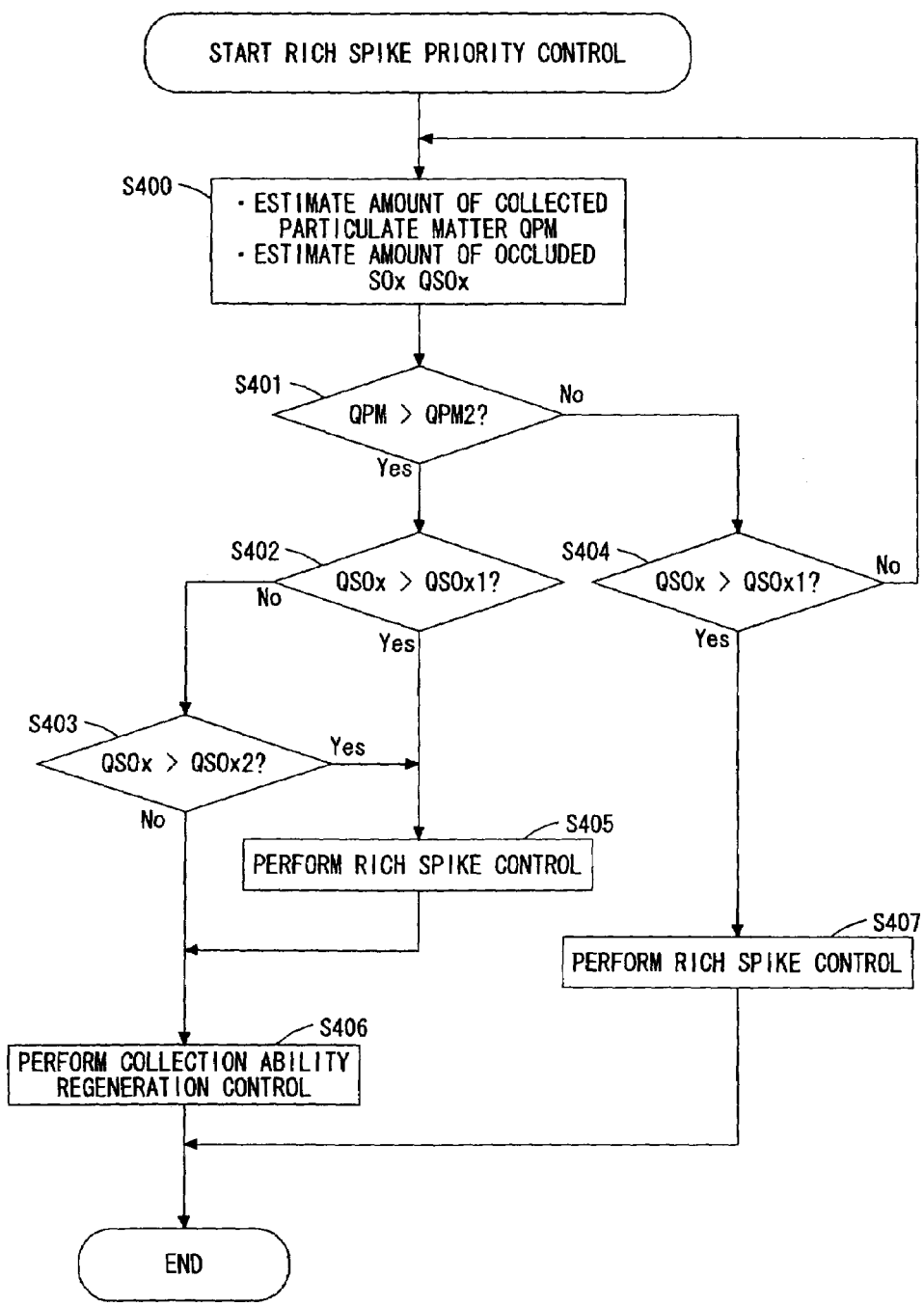
FIG. 8 is a flow chart showing the control of performing the release of the occluded SOx according to rich spike control in an exhaust gas purification system according to a fourth embodiment of the present invention.

Accordingly, opportunities to release the SOx occluded in the exhaust gas purification device 16 are increased by performing the SOx release control according to the rich spike control in preference to the collection ability regeneration control. Now, reference will be made to the control of oxidizing and removing the particulate matter collected in the exhaust gas purification device 16 in a more effective manner (hereinafter referred to as "rich spike priority control"), while referring to FIG. 8. FIG. 8 is a flow chart showing the rich spike priority control which is executed by the ECU 20.

In step S400, the amount of the particulate matter QPM collected in the exhaust gas purification device 16 and the amount of the SOx occlusion QSOx occluded in the exhaust gas purification device 16 are estimated. Specifically, the amount of the collected particulate matter QPM is estimated based on a pressure differential between the pressures of the exhaust gas at an upstream side and at a downstream side of the exhaust gas purification device 16 detected by the differential pressure sensor 33, as stated before, and the amount of SOx occlusion QSOx is estimated from the operation time of the internal combustion engine 1 and the amount of injected fuel from the last SOx poisoning recovery control, the concentration of sulfur in the fuel, etc. When the process in step S400 has been completed, the control flow proceeds to step S401.

In step S401, it is determined whether the amount of collection QPM estimated in step S400 is more than a predetermined amount of collection QPM2. The predetermined amount of collection QPM2 is a threshold for the amount of the particulate matter collected in the exhaust gas purification device 16 above which collection ability regeneration control should be started. Therefore, when it is determined in step S401 that the amount of collection QPM is more than the predetermined amount of collection QPM2, the control flow advances to step S402 so as to perform the collection ability regeneration control in the following processes. On the other hand, when it is determined in step S401 that the amount of collection QPM is less than or equal to the predetermined amount of collection QPM2, this means that the particulate matter collection ability of the exhaust gas purification device 16 still remains enough, and hence the control flow proceeds to step S404.

In step S402, it is determined whether the amount of SOx occlusion QSOx estimated in step S400 is more than a predetermined amount of SOx occlusion QSOx1. The predetermined amount of SOx occlusion QSOx1 is a threshold for the amount of the SOx occluded in the exhaust gas purification device 16 above which the rich spike control should be started. Accordingly, when it is determined in step S402 that the amount of SOx occlusion QSOx is more than the predetermined amount of SOx occlusion QSOx1, the control flow advances to step S405 so as to perform the rich spike control in the following processes, whereas when it is determined in step S402 that the amount of SOx occlusion QSOx is less than or equal to the predetermined amount of SOx occlusion QSOx1, the control flow advances to step S403.

In step S403, it is determined whether the amount of SOx occlusion QSOx estimated in step S400 is more than a predetermined amount of SOx occlusion QSOx2. The predetermined amount of SOx occlusion QSOx2 is a value that is smaller than the above-mentioned predetermined amount of SOx occlusion QSOx1. Therefore, in step S403, it is determined whether the amount of SOx occlusion QSOx estimated in step S400 is a value between the predetermined amount of SOx occlusion QSOx1 and the predetermined amount of SOx occlusion QSOx2.

Here, note that the predetermined amount of SOx occlusion QSOx2 is not such a large amount of SOx occlusion above which the rich spike control should promptly be started to quickly release the SOx occluded in the exhaust gas purification device 16, but it is defined as a threshold for the amount of SOx occlusion when lowering of the exhaust gas purification ability of the exhaust gas purification device 16 can be avoided as much as possible by preventively decreasing the amount of SOx occlusion of the exhaust gas purification device 16. Accordingly, when it is determined in step S403 that the amount of SOx occlusion QSOx is more than the predetermined amount of SOx occlusion QSOx2, the control flow advances to step S405 so as to perform the rich spike control in the following process, whereas when it is determined in step S403 that the amount of SOx occlusion QSOx is less than or equal to the predetermined amount of SOx occlusion QSOx2, this means that there is no need to execute the release of the occluded SOx according to the rich spike control, and hence the control flow advances to step S406.

Here, in step S405, the SOx release control according to the rich spike control is carried out so as to release the SOx occluded in the exhaust gas purification device 16. In this rich spike control, particularly when the air-fuel ratio of the exhaust gas flowing into the exhaust gas purification device 16 is made to be a lean-side air-fuel ratio, the particulate matter collected in the exhaust gas purification device 16 is also oxidized and removed. When the process in step S405 has been completed, the control flow goes to step S406 where the collection ability regeneration control is executed so as to oxidize and remove the particulate matter remaining in the exhaust gas purification device 16. Similarly, when the control flow advances from step S403 to step S406, the collection ability regeneration control is also executed so as to oxidize and remove the particulate matter collected in the exhaust gas purification device 16.

Next, reference will be made to the process in step S404 when the control flow advances from step S401 to step S404. In step S404, similar to step S402, it is determined whether the amount of SOx occlusion QSOx estimated in step S400 is more than the predetermined amount of SOx occlusion QSOx1. When it is determined in step S404 that the amount of SOx occlusion QSOx is more than the predetermined amount of SOx occlusion QSOx1, the control flow advances to step S407 so as to perform the rich spike control in the following process, whereas when it is determined in step S404 that the amount of SOx occlusion QSOx is less than or equal to the predetermined amount of SOx occlusion QSOx1, there is no need to perform the collection ability regeneration control and/or the rich spike control, so the processes from step S400 onward are carried out again. Here, note that in the process of step S407, the rich spike control is performed similar to the process of step S405.

After the respective control processes in steps S406 and S407 have been completed, this control processing is ended.

Figure 12:
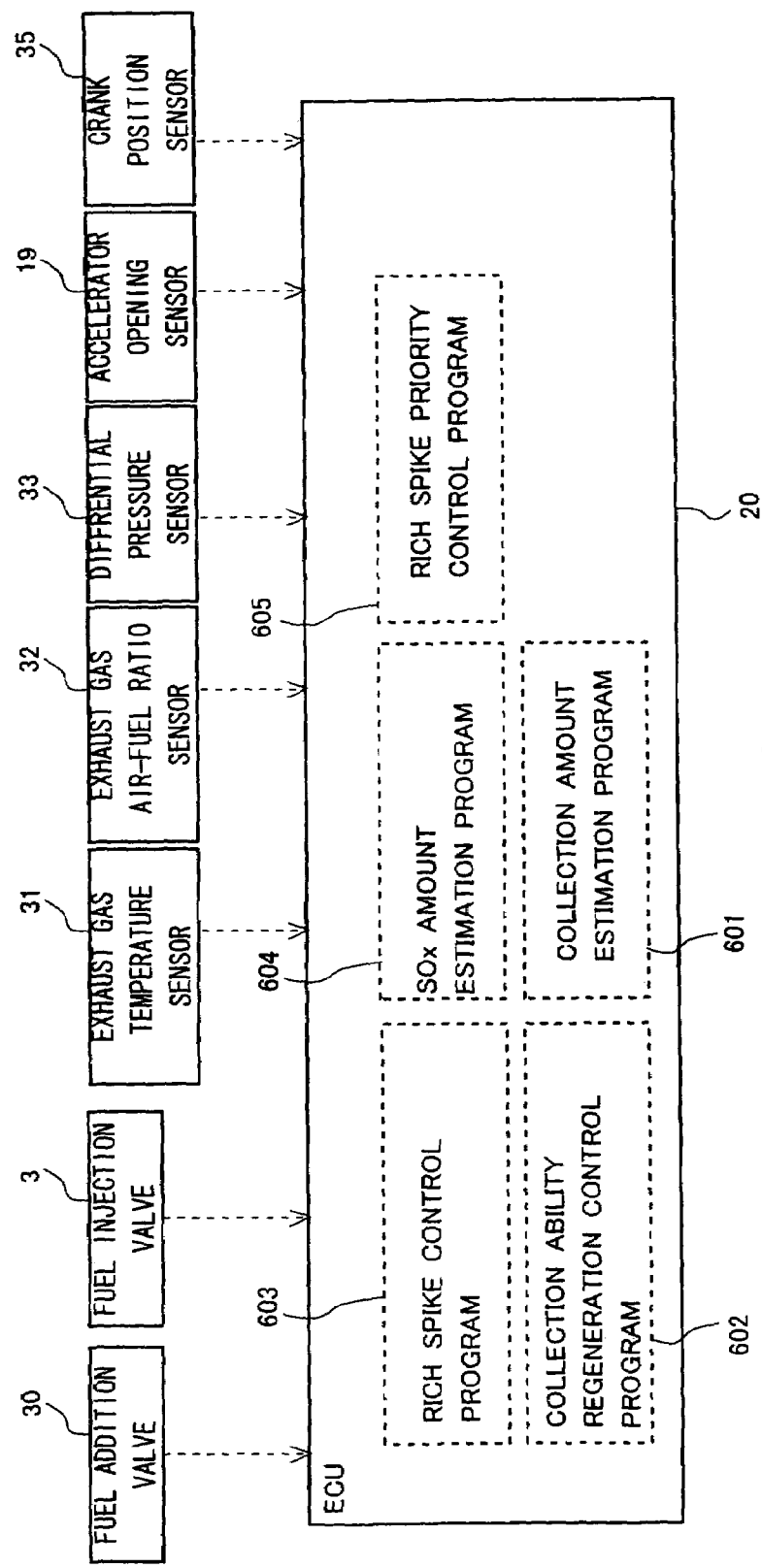
FIG. 12 is a control block diagram schematically showing the exhaust gas purification system according to the fourth embodiment of the present invention.

Here, note that in this control processing, control programs shown in FIG. 12 are stored in the ECU 20. Specifically, a collection amount estimation program 601 (i.e., a control program for mainly performing the processes of step S400 in this control) for estimating the amount of the particulate matter collected in the exhaust gas purification device 16 is stored in the ECU 20, and constitutes a collection amount estimation device together with the differential pressure sensor 33, etc. Also, a collection ability regeneration control program 602 for performing the collection ability regeneration control is stored in the ECU 20, and constitutes a collection ability regeneration control device together with the fuel addition valve 30, the fuel injection valves 3, the exhaust gas temperature sensor 31, etc. A rich spike control program 603 for performing the rich spike control is stored in the ECU 20, and constitutes a rich spike control device together with the fuel addition valve 30, the exhaust gas temperature sensor 31, the exhaust gas air-fuel ratio sensor 32, etc. An SOx amount estimation program 604 (i.e., a control program for mainly performing the process of step S400 in this control) for estimating the amount of the SOx occluded in the exhaust gas purification device 16 is stored in the ECU 20, and constitutes an SOx amount estimation device together with the accelerator opening sensor 19, etc.

Further, a rich spike priority control program 605 (i.e., a control program for mainly performing the processes of steps S402, S403 and S405 of this control) for executing the rich spike control in preference to the collection ability regeneration control when a prescribed condition holds is stored in the ECU 20, and constitutes a rich spike priority control device together with the fuel addition valve 30, the exhaust gas temperature sensor 31, the exhaust gas air-fuel ratio sensor 32, etc.

According to the control of this fourth embodiment, whenever it is necessary to execute the collection ability regeneration control and the rich spike control, the rich spike control has priority over the collection ability regeneration control so that the release of the SOx occluded in the exhaust gas purification device 16 carried out by priority. As a result, opportunities to release the occluded SOx are increased, thereby making it possible to more quickly recover the exhaust gas purification ability of the exhaust gas purification device 16. Additionally, oxidizing and removing the particulate matter collected in the exhaust gas purification device 16 when the air-fuel ratio of the exhaust gas is controlled to be a lean-side air-fuel ratio in the rich spike control, too, makes it possible to shorten the time required to oxidize and remove the particulate matter by the later performed collection ability regeneration control, whereby deterioration in fuel economy due to the collection ability regeneration control can be reduced or alleviated.

In step S404, when it is determined whether the amount of SOx occlusion QSOx is less than or equal to the predetermined amount of SOx occlusion QSOx1, performing the process similar to step S403 thereafter, whereby the amount of SOx occlusion in the exhaust gas purification device 16 can decrease and lowering of the exhaust gas purification ability of the exhaust gas purification device 16 can be avoided as much as possible.

As described in the foregoing, according to an exhaust gas purification system for an internal combustion engine of the present invention, opportunities to release the SOx occluded in an exhaust gas purification device are increased, thereby making it possible to more quickly recover the exhaust gas purification ability of the exhaust gas purification device.

While the invention has been described in terms of preferred embodiments, those skilled in the art will recognize that the invention can be practiced with modifications within the spirit and scope of the appended claims.

What is claimed is:

1. An exhaust gas purification system for an internal combustion engine, having an exhaust gas purification device having the property of occluding SOx in an exhaust gas emitted from said internal combustion engine and collecting particulate matter contained in the exhaust gas, said system comprising:

a collection amount estimation device that estimates an amount of particulate matter collected in said exhaust gas purification device;

a collection ability regeneration control device that controls the temperature of said exhaust gas purification device to be a predetermined temperature when the amount of collected particulate matter estimated by said collection amount estimation device exceeds a predetermined amount of collection;

an SOx amount estimation device that estimates an amount of SOx occluded in said exhaust gas purification device;

a rich spike control device that alternately controls the air-fuel ratio of the exhaust gas flowing into said exhaust gas purification device to be a rich-side air-fuel ratio or to be a lean-side air-fuel ratio when the amount of SOx occlusion estimated by said SOx amount estimation device exceeds a predetermined amount of SOx occlusion; and a rich spike priority control device that executes the control of said rich spike control device in preference to the control of said collection ability regeneration control device when the amount of collected particulate matter estimated by said collection amount estimation device exceeds the predetermined amount of collection, and when the amount of SOx occlusion estimated by said SOx amount estimation device exceeds the predetermined amount of SOx occlusion.

2. The exhaust gas purification system for an internal combustion engine as set forth in claim 1, wherein when the amount of collected particulate matter estimated by said collection amount estimation device exceeds the predetermined amount of collection, and when the amount of SOx occlusion estimated by said SOx amount estimation device exceeds a saturation preventive occlusion amount which is less than said predetermined amount of SOx occlusion even if the estimated amount of SOx occlusion does not exceed said predetermined amount of SOx occlusion, said rich spike priority control device executes the control of said rich spike control device in preference to the control of said collection ability regeneration control device.

3. The exhaust gas purification system for an internal combustion engine as set forth in claim 2, wherein said saturation preventive occlusion amount is less than said predetermined amount of SOx occlusion and a threshold for the amount of SOx occlusion capable of suppressing the exhaust gas purification ability of said exhaust gas purification device from being lowered by preventively decreasing the amount of SOx occluded in said exhaust gas purification device when said amount of SOx occlusion exceeds said saturation preventive occlusion amount.

* * * * *

UNITED STATES PATENT AND TRADEMARK OFFICE
CERTIFICATE OF CORRECTION

PATENT NO. : 7,464,542 B2  Page 1 of 1
APPLICATION NO. : 11/502521
DATED : December 16, 2008
INVENTOR(S) : Shunsuke Toshioka et al.

It is certified that error appears in the above-identified patent and that said Letters Patent is hereby corrected as shown below:

On the title page item (75), Note the following changes:

(75) Inventors: Shunsuke Toshioka, Numazu (JP);...Hisashi Ohki, Numazu (JP); ...Kotaro Hayashi, Mishima (JP)

(56) References Cited: FOREIGN PATENT DOCUMENTS: "JP A 6-727541  9/1994" should be "JP A 6-272541  9/1994"

Signed and Sealed this

Thirty-first Day of March, 2009

JOHN DOLL
*Acting Director of the United States Patent and Trademark Office*